United States Patent
Parse et al.

(10) Patent No.: US 9,102,867 B2
(45) Date of Patent: Aug. 11, 2015

(54) SINGLE COMPONENT NEUTRALLY BUOYANT PROPPANT

(76) Inventors: Joseph Buford Parse, Stow, MA (US); Bruce Donald Jette, Burke, VA (US)

(*) Notice: Subject to any disclaimer, the term of this patent is extended or adjusted under 35 U.S.C. 154(b) by 194 days.

(21) Appl. No.: 13/314,255

(22) Filed: Dec. 8, 2011

(65) Prior Publication Data

US 2012/0145390 A1    Jun. 14, 2012

Related U.S. Application Data

(60) Provisional application No. 61/420,941, filed on Dec. 8, 2010.

(51) Int. Cl.
*E21B 43/267* (2006.01)
*C09K 8/68* (2006.01)
*C09K 8/80* (2006.01)
(Continued)

(52) U.S. Cl.
CPC . *C09K 8/80* (2013.01); *B82Y 30/00* (2013.01); *C03B 19/107* (2013.01); *C03B 19/1075* (2013.01); *C04B 28/02* (2013.01); *C04B 35/6224* (2013.01); *C04B 35/62227* (2013.01); *C04B 38/009* (2013.01); *C09K 8/473* (2013.01); *C09K 8/62* (2013.01); *C09K 8/805* (2013.01); *E21B 43/267* (2013.01); *C04B 35/10* (2013.01); *C04B 2235/5284* (2013.01);
(Continued)

(58) Field of Classification Search
CPC ...... C04B 38/009; C04B 35/14; C04B 35/10; C04B 35/48; C04B 28/02; C04B 35/18; C09K 8/80; C09K 8/805; C09K 8/62; C09K 8/68; E21B 43/267; E21B 43/26
See application file for complete search history.

(56) References Cited

U.S. PATENT DOCUMENTS

| 3,127,937 A | 4/1964 | McGuire, Jr. et al. |
| 3,335,797 A | 8/1967 | Braunlich, Jr. |

(Continued)

FOREIGN PATENT DOCUMENTS

| WO | WO 96/27070 | 9/1996 |
| WO | WO 2008/018966 A2 | 2/2008 |

OTHER PUBLICATIONS

International Search Report and Written Opinion of the Int'l Searching Authority issued in corresponding PCT Application PCT/US2011/063913 and dated/mailed Apr. 9, 2012.

(Continued)

*Primary Examiner* — Zakiya W Bates
(74) *Attorney, Agent, or Firm* — Goodman, Allen & Filetti, PLLC; Charles M. Allen, Esquire; Matthew R. Osenga, Esquire

(57) ABSTRACT

Proppant is used to keep open a fissure in a reservoir created by hydraulic or other action. The proppant demonstrates a reduced specific gravity controlled by the geometry of the structure of the proppant. Proppant must be capable of withstanding the hydrostatic environment of the hydraulic pumping system, pass through a perforation in the casing of the well, travel into the fissure, and, upon reduction of hydrostatic pressure, withstand the closure pressure of the formation. A proppant can have neutral buoyancy or substantial neutral buoyancy and can yet be capable of withstanding the hydraulic and closure pressures and have a tubular structure hollow in the center with a wall of material sufficiently strong to withstand the majority of closure pressures.

36 Claims, 12 Drawing Sheets

(51) Int. Cl.

| | | |
|---|---|---|
| | *C09K 8/62* | (2006.01) |
| | *C04B 35/622* | (2006.01) |
| | *C04B 28/02* | (2006.01) |
| | *C04B 38/00* | (2006.01) |
| | *C09K 8/473* | (2006.01) |
| | *C03B 19/10* | (2006.01) |
| | *B82Y 30/00* | (2011.01) |
| | *C04B 35/10* | (2006.01) |

(52) U.S. Cl.
 CPC .......... *C04B 2235/6021* (2013.01); *C04B 2235/6028* (2013.01); *Y10T 428/2982* (2015.01)

(56) References Cited

U.S. PATENT DOCUMENTS

| | | |
|---|---|---|
| 3,399,727 A | 9/1968 | Graham et al. |
| 4,493,875 A | 1/1985 | Beck et al. |
| 4,541,981 A | 9/1985 | Lowery et al. |
| 4,547,468 A | 10/1985 | Jones et al. |
| 4,632,876 A | 12/1986 | Laird et al. |
| 4,654,266 A | 3/1987 | Kachnik |
| 4,668,645 A | 5/1987 | Khaund |
| 4,744,831 A | 5/1988 | Beck |
| 4,894,285 A | 1/1990 | Fitzgibbob |
| 4,921,820 A | 5/1990 | Rumpf et al. |
| 4,921,821 A | 5/1990 | Rumpf et al. |
| 4,944,905 A | 7/1990 | Gibb et al. |
| 4,977,116 A | 12/1990 | Rumpf et al. |
| 5,068,071 A | 11/1991 | O'Holleran |
| 5,120,455 A | 6/1992 | Lunghofer |
| 5,322,821 A | 6/1994 | Brezny |
| 5,534,348 A | 7/1996 | Miller et al. |
| 6,274,083 B1 | 8/2001 | Clark, III |
| 6,364,018 B1 | 4/2002 | Brannon et al. |
| 6,372,678 B1 | 4/2002 | Youngman et al. |
| 6,582,819 B2 | 6/2003 | McDaniel et al. |
| 6,617,024 B2 | 9/2003 | Sudo et al. |
| 6,758,067 B2 | 7/2004 | Ganan-Calvo et al. |
| 6,772,838 B2 | 8/2004 | Dawson et al. |
| 6,983,797 B2 | 1/2006 | Nguyen et al. |
| 7,036,591 B2 | 5/2006 | Cannan et al. |
| 7,066,258 B2 | 6/2006 | Justus et al. |
| 7,160,844 B2 | 1/2007 | Urbanek |
| 7,237,612 B2 | 7/2007 | Surjaatmadja et al. |
| 7,491,444 B2 | 2/2009 | Smith et al. |
| 7,571,767 B2 | 8/2009 | Parker et al. |
| 7,757,766 B2 | 7/2010 | Lewis et al. |
| 7,772,163 B1 | 8/2010 | Brannon et al. |
| 7,845,409 B2 | 12/2010 | Shinbach et al. |
| 7,849,923 B2 | 12/2010 | Burukhin et al. |
| 8,006,759 B1 | 8/2011 | Cochran, Jr. et al. |
| 2002/0128142 A1 | 9/2002 | Godeke et al. |
| 2006/0016598 A1 | 1/2006 | Urbanek |
| 2006/0065398 A1 | 3/2006 | Brannon et al. |
| 2006/0162929 A1 | 7/2006 | Urbanek |
| 2008/0087429 A1 | 4/2008 | Brannon et al. |
| 2008/0156490 A1 | 7/2008 | Burukhin et al. |
| 2008/0179057 A1 | 7/2008 | Dawson |
| 2008/0271889 A1 | 11/2008 | Misselbrook et al. |
| 2009/0038797 A1 | 2/2009 | Skala et al. |
| 2009/0137433 A1 | 5/2009 | Smith et al. |
| 2009/0178807 A1 | 7/2009 | Kaufman et al. |
| 2011/0160104 A1 | 6/2011 | Wu et al. |

OTHER PUBLICATIONS

International Search Report and Written Opinion of the Int'l Searching Authority issued in related PCT Application PCT/US2011/064011 and dated/mailed on Apr. 5, 2012.

Supplementary European Search Report and Written Opinion of the European Patent Office issued in corresponding PCT Application PCT/US2011/063913 and dated Jun. 12, 2014.

Supplementary European Search Report and Written Opinion of the European Patent Office issued in corresponding PCT Application PCT/US2011/064011 and dated Jun. 12, 2014.

SINGLE COMPONENT NEUTRALLY BUOYANT PROPPANT

CROSS-REFERENCE TO RELATED APPLICATIONS

This application claims the benefit of U.S. Provisional Application No. 61/420,941, filed Dec. 8, 2010, the contents of which are incorporated herein by reference.

FIELD OF THE INVENTION

The present invention relates generally to proppants for use in hydraulic fracturing and more particularly to neutrally buoyant proppants.

BACKGROUND OF INVENTION

The need for energy has spawned numerous new techniques for recovering hydrocarbons from more and more challenging reservoir environments. One such effort has been the recovery of gas from tight rock formation. In these formations, the rock has a low porosity but the entrapped gas is at high pressures within the rock. Wells are drilled into this rock to liberate the gas and collect it in the well itself for recovery and distribution. Such wells are cased with a steel liner which is cemented to the formation. To generate a communication channel to the rock containing the gas, perforation charges are detonated within the well punching a hole through the steel, cement, and into the rock formation. Penetration of the shaped charge used to penetrate the formation normally extends from a few inches to less than 10 feet. This provides very limited penetration into the gas bearing rock and, therefore, limited ability for the gas to move to the well bore.

To improve communication between the well bore and the rock, hydraulic fracturing of the rock is performed. High pressure water is pumped into the well, through the perforation in the casing and cement, and into the damaged formation caused by the perforation charge. As the pressure exceeds the formation pressure, the rock begins to break along preferential weaknesses. This opens fissures in the rock that extend in vertical fractures. That is, the fractures that are created tend to be larger in the vertical direction than in the horizontal direction by several orders of magnitude. Propagation tends to be along stress lines already in the formation. These fissures then form a pathway for the gas to move from the face of the fractured rock to the well bore for recovery. The high pressure forces the gas out of the minimally porous rock when it experiences a significant drop in pressure. The fracture pressure represents hydraulic pressures on the order of the formation pressure (essentially due to the weight of the layers of rock above). After the relaxation of pressure of the hydraulic fracturing fluid, the pressure in the fracture is minimal in comparison to the rock. This means the rock experiences an relatively low surface pressure while experiencing extremely high internal pressures. Diffusion of gas from the internal rock can then flow to the fissure which essentially creates a channel to the well bore. The lack of porosity in the rock eventually depletes the gas at the surface of the rock which exposes the interior rock to the reduced pressures. As this progresses, the depletion layer moves in ever more slowly. This means that for a larger recovery of gas from the rock the greatest value is from the greatest exposure of the surface area of the rock rather than simply providing a pathway for the gas to pass to the well.

Fracturing the rock both provides a greater surface area for diffusion from the rock and improves diffusion of the gas through the rock from the high pressure zone. The greater the surface area exposed, the greater the initial gas produced. However, this also facilitates long term recovery of gas. Therefore, it is beneficial to maintain the transport properties of the fracture.

Hydraulic fracturing causes the rock to separate to create the fracture channel. As the rock fractures, the parted rock is composed of a surface with an opposing mating surface. If the hydraulic pressure is reduced, the result is that the two rock surfaces come together, effectively mating. Thus no channel remains.

To ensure a continuing channel, proppant is inserted into the fracture. The expressed purpose of the proppant is to prop open the channel. This prevents the closure of the rock faces, negative and positive, created upon fracturing due to the randomness of the interstitial proppant material.

While it is useful to create a separation of the two surfaces of the rock composing the wall of the fracture, proppant would be of little value if it did not provide a highly conductive zone to the well bore from the rock face. Granularity produces this conductive character by creating interstitial spaces between the particles composing the proppant through which the gas can flow. The proppant must, then, be strong enough to hold open the formation without losing this interstitial space or percolation network. Failure of the proppant can occur if the formation pressure is so great that the stress on the particle exceeds its strength and the proppant particles break. When this happens, the particles are forced closer together reducing the overall void space comprising the percolation network. In addition, structural failure can produce fragments of the proppant which further fill the void space and reduce overall conductivity.

There arises the challenge of finding a material which can withstand the closure pressures without losing its percolation network while facilitating flow into the formation crevices to maximize the amount of the fracture that remains open.

Materials which have been used for this purpose have been, for the most part, naturally occurring. Probably the most common is various types of sand. The irregular shapes of the particles prevent close packing resulting in a natural percolation network. The structural strength of the sand prevents formation closure and maintains the network. However, two primary shortcomings are associated with sand. First, the specific gravity of sand tends to be approximately 2.8 making it significantly heavier than the water, a specific gravity of 1.0, or brine, a specific gravity of as much as 1.2, which is used for fracturing and to carry the proppant into position. As a result, the sand tends to settle out during the insertion process. To avoid this, additives are mixed into the water or brine to increase the viscosity and, in some cases, the specific gravity to extend the settling time of the sand.

While this improves the depth to which the proppant penetrates into the fracture, it is believed that little of the proppant reaches more than a relatively small percentage of the total fracture zone. Additionally, the thickening agents themselves have deleterious effects. Under high pressure, the agents can be pressed into the formation rock further reducing its porosity and permeability. The agents and fracturing fluids flow back up the well bore causing a disposal problem. Additionally, some fraction of these agents typically remains trapped in the proppant bed, reducing its permeability.

To optimize the flow of proppant into the fracture while eliminating or reducing the need for thickening agents, proppant must match as closely as possible the specific gravity of the hydraulic fracturing fluid. This would keep the proppant material suspended in the fracturing fluid to allow it to penetrate into all segments of the formation into which the fluid penetrates.

Several techniques are used to reduce the specific gravity of proppant. One is to select a proppant which has a lower specific gravity. Examples of just such a low specific gravity are organic materials such as walnut shells, pits, husks, and the like. However, these lighter materials tend to introduce other limitations. While walnut shells would penetrate deeper into the formation, their structural strength limits their applicability to relatively small formation closure pressures. Crushing the walnut shells eliminates the spaces between the shell fragments, fills them with newly produced small broken particles, and drastically reduces the percolation network.

Another method of reducing the specific gravity of proppant has been to produce light materials as the core of the proppant, most often ceramics and metal oxides, which are then bound together into a particle by use of an adherent or through sintering. Kaolin, clays, and alumina are often used as precursors which may be bound together with a sacrificial binder which is burned off or becomes part of the chemical processing during sintering. Glass spheres both naturally occurring as well as manmade may also be incorporated. This composition provides improved structural integrity and reduced density. However, the material may remain porous and allow degradation during exposure to the fracturing fluid or well flow. And, the particle strength must be balanced against the degree of structural integrity desired. The greater the structural integrity, the greater the general density of the particle, and the less the buoyancy.

Methods of making organic and ceramic proppants less porous and structurally stronger include various methods of coating them with sealing or hardening shells. This does improve their strength but with limitations and at the cost of some of the buoyancy. The harder shell tends to increase the density overall of the proppant particle which requires the core to be lighter and, more likely, less structurally sound. It becomes a balancing effort to add coating at the least cost to proppant weight while increasing the overall strength.

Another method of reducing the specific gravity of proppant while retaining structural strength is to coat a strong but dense proppant with a low specific gravity material such as microspheres. The aggregate specific gravity of the coated particle then is reduced. Coated particles can be better suspended in the fracturing fluid. Once in place, the formation closes on the coated particle causing the coating to break off the particle or, if soft to deform. This may reduce the void space and, therefore, the percolation network.

While coating proppants may reduce their specific gravity, the fundamental properties of the proppant are generally not changed. While some coatings are meant to harden the exterior of the proppant thereby contributing to some strength, coated proppant ultimately behaves as the base particles. Sand, if coated, can have its specific gravity reduced. However, the material strength of the sand remains limited and, if exceeded, fractures producing small fragments which can occlude the interstitial spacing comprising the percolation network. Some coatings may be applied to capture these fragments but then are not designed for reduced or neutral buoyancy. While the coating may reduce the flow of small fragments, the overall change of the size of the fragments of a particle once broken by entropy will occupy more space than they did before breakage. In addition, the coating will occupy space. Therefore, even coated proppant meant to capture these "fines" will have reduced conductivity if the particle fails.

Recognizing the need for stronger proppants, especially for deeper wells where the formation closure pressures are greater and that many of the more common proppants such as sand will fail, stronger proppant which tend to be manufactured have been developed. Ceramic proppants are a primary class of just such a manufactured material. These materials provide strength that allows the proppant to withstand formation closure pressures at depths in excess of those at which sand and other more common proppants fail. However, the materials necessary to produce these hard materials provide strength but at a significant cost in specific gravity. Many manufactured proppants have specific gravities as high as 3.8. While the hardness reduces the structural shortcomings, it exacerbates the difficulty of placement into the fractures.

The primary method of countering excessive specific gravities of proppants has been to thicken the fracturing fluids with various polymerizers. The gel-like consistency allows the heavier proppants to be flowed deeper into the fractures by extending the settling time. Pressures are then increased and higher pumping speeds used to move the fluid and proppant into the fracture. However, this same pressure forces some of the fracturing fluid into the pores of the formation rock. As a result, the already low permeability rock has its pores filled with the thickening agents. It is believed that this further reduces the recovery of gas or oil from the reservoir. It would then be especially beneficial if the amount of thickening agents necessary were either reduced or eliminated all together.

SUMMARY OF THE INVENTION

The invention relates to various exemplary embodiments, including fibers, particles, proppants, products, and methods of making and using the same.

These and other features and advantages of exemplary embodiments of the invention are described below with reference to the accompanying drawings.

DETAILED DESCRIPTION

Figure 1:
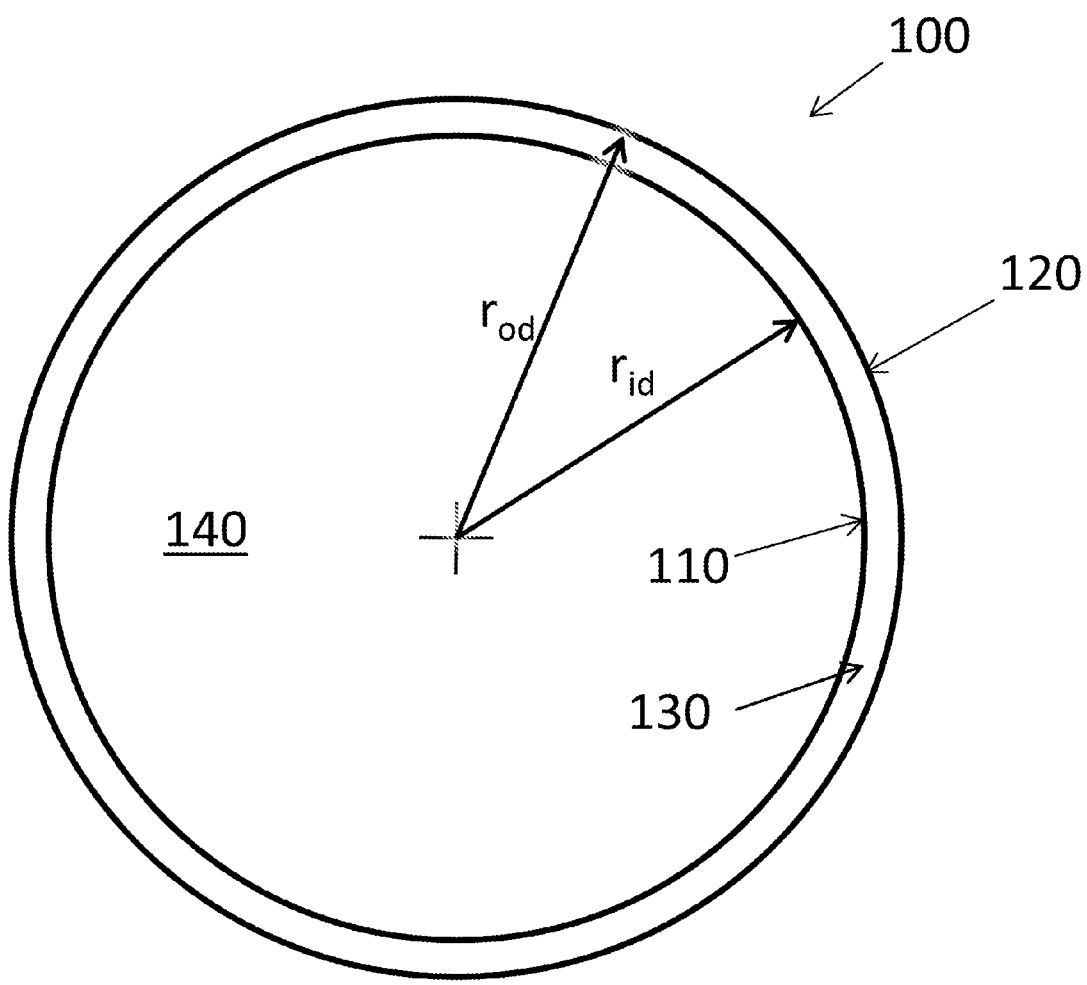
FIG. 1 is a transverse cross-section of a proppant particle having a substantially cylindrical shape.

In the following detailed description, numeric values and ranges are provided for various aspects of the implementations described. These values and ranges are to be treated as examples only and are not intended to limit the scope of the claims. In addition, a number of materials are identified as suitable for various facets of the implementations. These materials are to be treated as exemplary and are not intended to limit the scope of the claims.

There is a need for a manufactured proppant which can be tailored from a material or combination of materials and in sizes to meet specific constraints or requirements during the fracturing process but which provides structural strengths sufficient to withstand the closure pressures of a formation at a specific depth while having neutral buoyancy or substantially neutral buoyancy. The material used in the manufacturing of the proppant must be able to also withstand and remain stable in the general chemical environment. Aggregate quantities of this proppant must also create a percolation network due to voids between particles to allow for flow of gas or oil through the aggregate pack. Other characteristics of the particle include smoothness of the surface to reduce flow friction and graceful degradation in structural failure, specifically, fragmenting of the particles producing shards rather than small grains which can block the percolation network.

Desirable characteristics of a proppant, then, are that it be easily flowed into the fracture as part of the hydraulic fracturing process, there be little or no damage to the proppant during this flowing process, little or no damage to the pumping system results from the proppant, a percolation network is formed which allows communication from the rock face to the well bore, and the formation closure pressure not cause the loss of the percolation network through reduction of pore size or creation of fragments which fill the pore space. In addition to these primary characteristics, stability in the chemical environment is also essential.

The present invention relates to the product and methods for producing particles, such as glass or ceramic particles, for example hollow spheres or hollow closed ended elongated particle composed of glass, ceramic, metals, metal oxides, or a combination such that the particle has a neutral buoyancy or substantively neutral buoyancy while retaining structural integrity against hydrostatic or contact loading. It is to be understood that for purposes of the present invention that these particles can be useful in many applications, including, but not limited to, as proppants for hydrocarbon recovery operations. It is to be further understood that the term "proppant" or "proppants" while having an understood meaning in hydrocarbon recovery, is used herein to not be limiting to its manner of use. The proppant or proppants described herein are useful in other applications, such as the examples provided in the paragraphs preceding the examples. Set forth below are various implementations of the present invention. However, it is to be understood that while hollow spheres or hollow closed ended elongated particles and their formation are described, it is understood that each and every one of these implementations and features apply to hollow particle forming, the formation of hollow glass or ceramic particles, and their uses. The present invention provides methods to make hollow spheres or hollow closed ended elongated particles, that have a controlled size (transverse dimension, length in the case of all but hollow spheres, and wall thickness) and/or a controlled density, and/or controlled structural compression resistance and/or controlled structural hydrostatic compression resistance, and/or resistance to chemical attack and/or enhancement of fluid flow through a dense packing of particles. The term "controlled" herein preferably means that the one or more properties are "dialed in" to meet the objectives of use for the particular implementation due to the process(es) described below. This ability to achieve control of one or more of these properties is desirable for purposes of achieving desirable strength and/or weight and/or durability and/or use of the particles and is desirable for providing a consistent product to users of the particles, and/or is desirable to provide particles to meet customer needs based on the particular project since the particles can be made based on the "dialed in" specifications that are achievable herein. It is to be understood, that the present invention can have a density of about 0.8 gm/cm$^3$ to 1.75 gm/cm$^3$ and the corresponding specific gravity of about 0.8 to 1.75 which will be less than the density or specific gravity of the same material and shape having no void in the center.

The implementations described herein relate to a product which is a single component neutrally buoyant proppant which is hollow, a hollow closed ended elongated particle, having a uniform and contiguous wall composed of glass, ceramic, metal, or metal oxides. The particle formed in this way will be referred to as proppant although the use of the term does not exclude its use in applications outside of the gas and oil industry. Additional applications will be provided below.

The general term "proppant" is used herein to refer to any type of sized particles to be mixed with fracturing fluid to hold fractures open during or after a hydraulic fracturing treatment. As noted above, proppants are not limited to this application. The term may also include "proppant particles" or fibers that make up such proppant particles.

The term "proppant aggregate" is used herein to refer to a large quantity of the proppant particles such that an aggregate characteristic may be applied to the quantity that may not be directly attributable to individual particles. The term also may include "aggregate."

"Hydraulic fracturing fluid" or "fracturing fluid" is the fluid injected into the rock in hydraulic fracturing. The injected fluid is typically a slurry of water, proppants, and chemical additives. Additionally, gels, foams, and compressed gases, including nitrogen, carbon dioxide and air can be injected. The composition of the fluid may change slightly during the course of the process as it mixes with other substances.

A "neutrally buoyant" particle or body neither sinks nor rises in a particular fluid medium. For example, a proppant is "neutrally buoyant" if its mass equals the mass of the fracturing fluid that it displaces when immersed therein. Because of the different fluids used in fracturing operations, neutral buoyancy may occur in fluids with specific gravities of about 0.8 to 1.75.

The term "substantially neutrally buoyant" is used herein to describe a property of a physical body where the mass of the physical body per unit volume is more than that of an equal volume of the fluid in which it is suspended and, therefore, of greater specific gravity but due to the viscosity of the fluid and the particle size and shape, has a settling time in the fluid less than half that of a similar but fully dense (solid rather than hollow) particle. As used herein, references to "neutrally buoyant" proppant will include the concept of "substantially neutrally buoyant" proppant unless specifically stated to the contrary.

It should be understood that the goal of neutrally buoyant proppant is to minimize gravimetric segregation of the proppant in the surrounding medium (specifically settling to the bottom). One skilled in the art will recall that the settling (or rising) velocity of a particle in a fluid is described by Stokes' law:

$$V_s = \frac{2}{9}\frac{(\rho_p - \rho_f)}{\eta}gR^2$$

where: $V_s$ is the particles' settling velocity in m/s, (downwards if $\rho_p > \rho_f$, upwards if $\rho_p < \rho_f$); g is gravitational acceleration in m/s$^2$; $\rho_p$ is the apparent density of the particles in kg/m$^3$, and $\rho_f$ is the mass density of the fluid in kg/m$^3$ and $\eta$ is the fluid viscosity in kg m$^{-1}$ s$^{-1}$.

One skilled in the art will also recall that, as hydrostatic pressure of a fluid increases with depth, the density of that fluid will change in accordance with its bulk modulus, and that the apparent density of a substantially neutrally buoyant proppant will also change with hydrostatic pressure in accordance with its detailed structure and the elastic modulus of its component materials, although not in precisely the same manner as the fluid. Similarly, the fluid density and apparent density of a proppant particle will both vary with changes in temperature, although not to the same degree. The implementations described herein are not limited to a precise mathematical relationship between the density of a given fluid and a particular proppant. Rather, these implementations will permit one skilled in the art to manufacture hollow, rigid proppant of a desired apparent density which is lower than about 1.75 g/cc. The proppant will still possess sufficient mechanical strength to withstand the hydrostatic pressures required for creating hydraulic fractures in geological formations, and will also possess sufficient mechanical strength to withstand the fracture closure stress required to prop the fracture open after the hydrostatic pressure has been reduced to bring about closure; the proppant will avoid undergoing plastic deformation.

In particular implementations, a product is described which comprises a single component neutrally buoyant proppant which demonstrates a specific gravity of about 1.0 to 1.9 that can be used in hydraulic fracturing of either natural gas or oil wells. Other applications will be defined as well.

In one implementation, the proppant is composed of individual grains of size similar to proppant in current use. During the fracturing process, many of these grains will remain behind in an aggregate layer between the two surfaces of the fractured formation. This aggregate layer forms the percolation network between the grains and provides the structural integrity to hold the fracture open. While a portion of the grains may fracture under formation pressures, the grains are designed to generally withstand a target closure stress. To reduce the density of the grain such that a reduced specific gravity is achieved, each grain is formed with a hollow center and sealed ends. A long cylindrical shape is chosen to allow for greater distribution of load while providing an increased encapsulated volume per grain.

To design the proppant, a material is selected for the proppant which provides desired characteristics such as strength, density, chemical resistance, availability, manufacturability, and cost effectiveness. One such example would be a glass. Glass is structurally strong, rigid and high in compressive strength; of modest density, with a SG of about 2.0 to 3.0; chemically resistant in all but highly alkaline environments; manufacturable; readily available; and, given to its derivation from sand and common chemicals, cost effective. Glass properties such as strength, chemical resistance, and cost are well known versus their chemical compositions allowing for a broad selection of possible candidate materials.

Next, a grain size is chosen which bounds the transverse dimension and length. This is often to ensure a specific packing density, aggregate layer formation thickness, flowability during pumping, and interaction with the rock surface.

A target formation pressure is defined. This will help define an acceptable wall thickness for the proppant particle. Modeling of the stresses in such a closed cylinder allows for minimizing the wall thickness while retaining sufficient strength to withstand the formation pressures.

For a given formation pressure, then, a wall thickness can be combined with a maximum particle transverse dimension to define the cylinder particle make-up. Knowing the maximum length, the particle can be extended to extend the void space. As the particle is extended in length, there is more material comprising the particle due to the particle wall increasing in length. However, the void space is increased as well. It is possible to decrease the specific gravity of the proppant particle to a desired value or the minimum value at the maximum acceptable length through this design.

An implementation according to the present invention is shown in FIG. 1. Proppant particle 100 is shown implemented having a substantially cylindrical cross section shape. Particle 100 is formed of a specific material so as to have an inner wall 110 at a radius from the center, $r_{id}$, and an outer wall 120 at a radius from the center, $r_{od}$. The particle size can be specified by defining the $r_{od}$ of the wall 120. The thickness of the wall structure 130 can be defined by defining the $r_{id}$ of the wall 110. This creates a void space 140 internal to the particle defined by the inner wall 110. A wall structure 130 of sufficient thickness provides proppant particle 100 with sufficient strength to withstand hydrostatic pressure of a fracturing fluid and closing pressures from a hydraulic fracture. Wall structure 130 may be formed of a material that is substantially impervious to the fracturing fluid; proppant particle 100 has a density that is substantially similar to the density of the fracturing fluid. Particle 100 is shown with a single void space 140. Particle 100 may have multiple void spaces 140, such that the total transverse dimension of the void spaces 140 is at least about 0.2 times or at least about 0.3 times the maximum transverse dimension of the particle 100.

Figure 2:
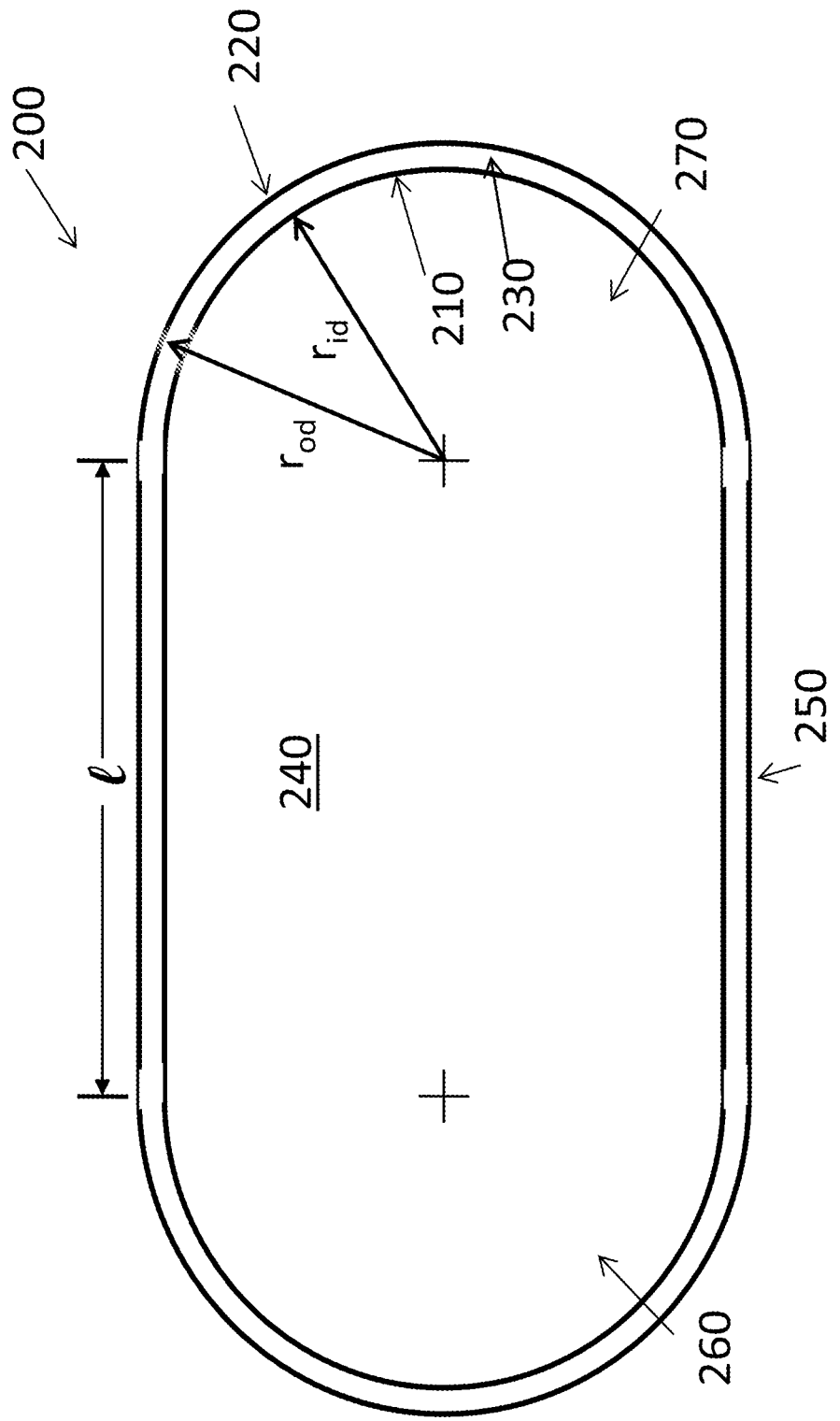
FIG. 2 is a longitudinal cross-section of a proppant particle having an elongated shape.

A second implementation of proppant particle 200 is shown in longitudinal section in FIG. 2. Proppant particle 200 is shown implemented having a elongated shape with closed ends. For simplicity of analysis the closed ends are considered to be hemispherical in character. The inner wall 210 at a radius $r_{id}$ from the center of each hemisphere may be defined independently of the outer wall 220 at radius $r_{od}$. A wall structure 230 of a particular thickness is defined by these two radii. Between these two hemispherical ends is a cylindrical segment 250 of length l comprised of a wall structure 230 of thickness comparable to that of these hemispherical ends forming a single interior void space 240. Wall structure 230 provides proppant particle 200 with sufficient strength to withstand hydrostatic pressure of a fracturing fluid and closing pressures from a hydraulic fracture. Wall structure 230 may be formed of a material that is substantially impervious to the fracturing fluid; proppant particle 200 has a density that is substantially similar to the density of the fracturing fluid.

Proppant particle 200 includes cylindrical segment 250 and end portions 260, 270. End portions 260, 270 may have slightly different shapes. For example, end portions 260, 270 may be substantially hemispherical, substantially flat, or substantially elongated.

Figure 3:
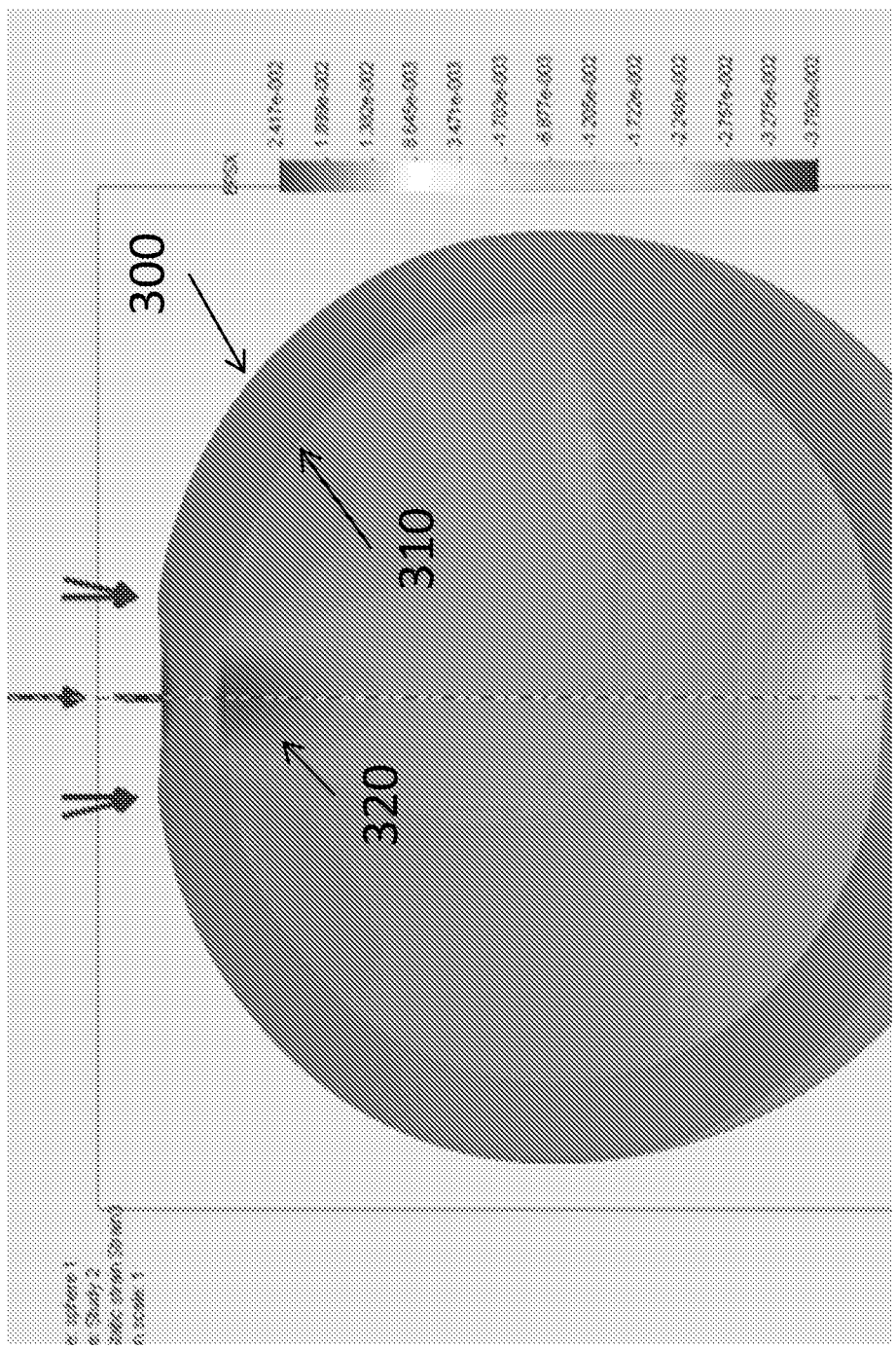
FIG. 3 show the results of a finite element analysis of loading of a hollow sphere

An implementation according to the present invention is shown in FIG. 3. To maximize displacement while minimizing total mass of the object, hollow sphere 300 would be the first choice. This would mean that for a sphere:

$4/3 \pi r_{od}^3 = V_s$ (volume of sphere)

$4/3 \pi r_{id}^3 = V_v$ (volume of void space of sphere)

$4/3 \pi (r_{od}^3 - r_{id}^3) = V_w$ (volume of wall)

$V_w \rho_s = M_s$ (mass of sphere)

where $\rho_s$ is the density of the material of which the sphere is produced. Therefore, for a homogeneous material, it can be seen that $4/3 \pi \rho_s (r_{od}^3 - r_{id}^3) = M_s$ (mass of the sphere)

A sphere of a given volume is defined only by its outer radius, $r_{od}$. Therefore, for a volume of a sphere is fixed for a given $r_{od}$. Clearly since the term preceding the brackets is a constant for a given material, the only way to reduce total mass of a sphere given a defined outer radius, $r_{od}$, can only be reduced by increasing $r_{id}$.

For the same material, it is possible to examine the strength of the wall at a given thickness $(r_{od} - r_{id}) = T_w$ (thickness of sphere wall)

Specific gravity is defined as the ratio of the density (mass per unit volume) of a substance or object to the density (mass per unit volume) of a reference substance. Normally this reference substance is water at standard temperature and pressure or 1 gm/cm³. Since the volume of the hollow sphere is defined for a given $r_{od}$, the specific gravity can only be changed by reducing the wall thickness, $T_w$, by increasing $r_{id}$. It is desirable to create a proppant having a specific gravity (SG) equal or close to the SG of the hydraulic fracturing fluid.

The stresses and strains in a thin wall of a sphere can be investigated as Von Mises Stresses and strains. Spheres will contact a surface only at a point. When equation load is applied to a small circular region of particle 300, a finite element analysis produces a strain plot as shown in FIG. 3. Regions of peak strain 320 are shown on interior wall 310 of hollow sphere 300. A closer examination of the vicinity of the maximum stress and strain can provide insight into the maximum load a particular hollow sphere 300 can withstand prior to failure.

Referring to FIG. 3, hollow sphere 300 of $r_{od}$=0.5 mm and $T_w$=45 μm under and 8,000 psi closure stress (2.5 lbf on projected area of 0.020" dia.) exhibits a Von Misies Strain of approximately 2.9% which is near the upper limit of the strain-to-failure for borosilicate fibers. To reduce this strain, the wall thickness can be increased.

However, increasing the wall thickness, as shown above, also increases the specific gravity of hollow sphere 300. This is in conflict with the fundamental objective of a neutrally buoyant or substantially neutrally buoyant proppant. To resolve this, an additional variability is necessary.

Figure 4:
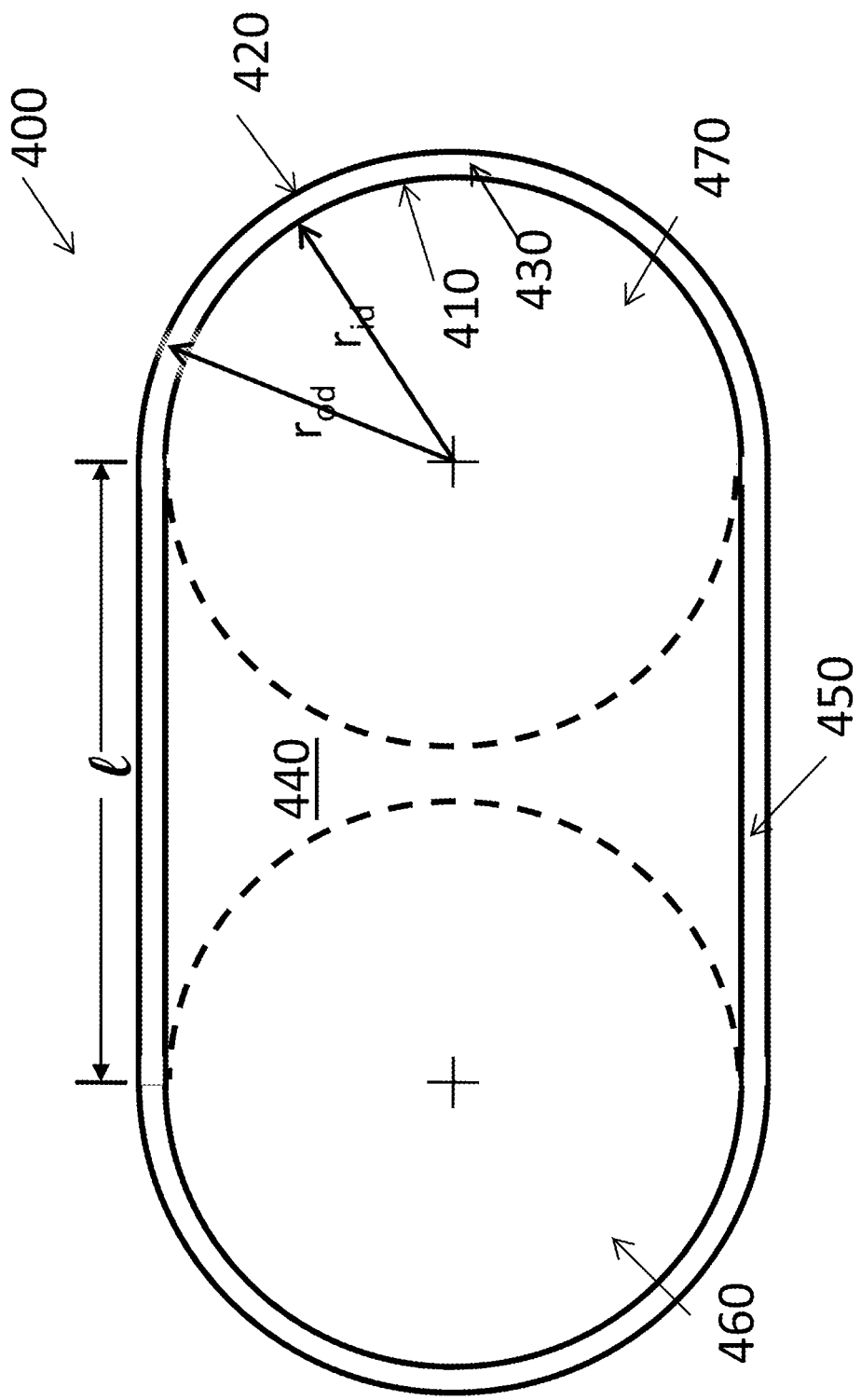
FIG. 4 is a longitudinal cross-section through an elongated cylindrical particle as in FIG. 2.

As shown in FIG. 4, by extending one axis of the sphere, hollow cylinder 400 with hollow hemispherical ends 410, 420 can be achieved which increases the total void space of the proppant particle for a given transverse dimension. A similar analysis of the volume to that above may be made.

$4/3 \pi r_{od}^3 = V_c$ (volume of cylinder)

$4/3 \pi r_{id}^3 + \pi r_{id}^2 l = V_{vc}$ (volume of hollow cylinder void)

$4/3 \pi (r_{od}^3 - r_{id}^3) + \pi l (r_{od}^2 - r_{id}^2) = V_{wc}$ (volume of wall)

$V_{cw} \rho_s = M_{cs}$ (mass of sphere)

$[4/3 \pi (r_{od}^3 - r_{id}^3) + \pi l (r_{od}^2 - r_{id}^2)] \rho_s = M_c$ (mass of the cylinder)

This shows that the volume of the hollow cylinder is greater than a hollow sphere of equal size and wall thickness by the volume of the cylinder:

$\pi l r_{od}^2$ = volume of cylindrical segment $\pi l r_{id}^2$ = volume of cylindrical void segment $\pi l (r_{od}^2 - r_{id}^2)$ = volume of cylindrical wall segment Therefore, for a given proppant particle with equal $r_{od}$ and $r_{id}$ to that of a comparable spherical proppant particle, the increased volume is directly proportional to the length of the cylindrical segment, l. It is not as clear what effect the added cylinder wall would have on the mass of the particle. Simply multiplying the volume of the cylindrical wall segment, above, by $\rho_s$ provides no additional insight. Consider instead comparing a hollow cylindrical proppant particle which is no longer than 4 times the $r_{od}$. This allows direct comparison of two spherical particles of equal $r_{od}$ to a single hollow cylindrical having the same dimensions. FIG. 4 shows the comparison graphically.

Using a specific material is the simplest way to provide a clear understanding of the value of the cylindrical length.

Assuming:

$r_{od}$=0.150 mm $r_{id}$=0.100 mm $l = 2 r_{od}$=0.300 mm $\rho_s = 2.23 \times 10^3 \frac{g}{mm^3}$ Below is the comparison of the resulting critical mm/mm³ characteristics:

| Proppant | "l" | Volume (mm³) | Mass (gm) | Density (gm/cm³) |
|---|---|---|---|---|
| Hollow Sphere | | 1.414E−02 | 2.218E−05 | 1.569259 |
| Hollow Spherical Ended Cylinder | $2r_{od}$ = .3 mm | 3.534E−02 | 4.85E−05 | 1.371037 |
| Hollow Spherical Ended Cylinder | $4r_{od}$ = .6 mm | 5.655E−02 | 7.47E−05 | 1.321481 |
| Hollow Spherical Ended Cylinder | $6r_{od}$ = .9 mm | 7.775E−02 | 1.010E−04 | 1.2989562 |

The additional mass is offset by the significant increase in volume. That is reflected in the particle density. For an assumed transverse dimension and wall thickness, it is possible to essentially define the density and, therefore, specific gravity.

A characteristic found uniformly to be useful is surface smoothness. A smooth surface provides a decreased resistance to flow. The smooth surface reduces points on the surface that can cause stress concentrations. Finally, the smooth surface provides a consistent surface on which the loads can be consistently applied.

With a smooth surface hollow closed ended elongated proppant, it is possible to achieve manufacture an engineered proppant having particular stress/strain characteristics sufficient to withstand the formation pressures yet capable of achieving neutral buoyancy or substantially neutral buoyancy. Design of the proppant must begin with the target formation pressure.

While the following design discussion facilitates determining the physical dimensions of a proppant particle, their specifics are dependent on performance limitations. Closure pressure of the formation is the primary source of failure in the proppant particle as will be discussed. Much as other proppants offered in the commercial market, the proppant described herein will be designed and graded by its ability to withstand formation closure pressures. Formation pressures of interest range from 2,000 psi to 18,000 psi. Hydrostatic pressures will be discussed later to discern the particles ability to withstand pumping pressures.

Figure 5:
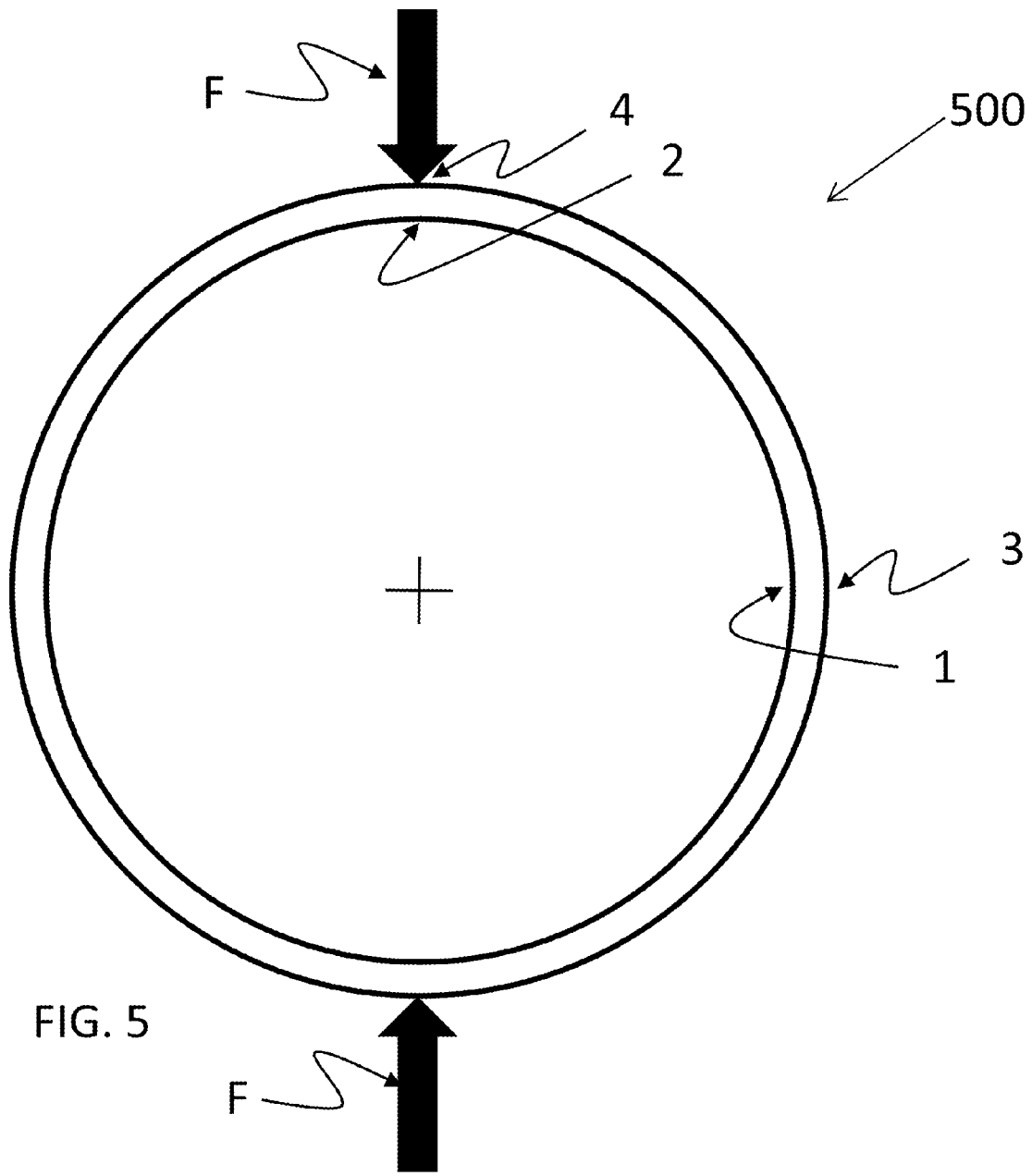
FIG. 5 is a cross-section of a proppant particle as in FIG. 1 showing the location of peak stresses.

A cross-section of an implementation of a proppant is shown in FIG. 5. The cross-section can be analyzed as a thick walled cylinder. Hollow pins and rollers have been extensively studied (see for example Roarks Formulas for Stress and Strain, 7'th Ed., McGraw-Hill, 2001) and show comparable characteristics. In the analysis, the hollow cylinder is considered to be loaded as shown in FIG. 5. Load p (per unit length) is applied to proppant 600. Points 1, 2, 3, and 4 provide indications of stress levels at key points of peak stress.

$$\sigma = K \frac{2p}{\pi b}$$

where p=load/unit length of the pin; K depends on the ratio a/b determined in the table below (plus sign indicates tension, negative sign indicates compression).

| | | | | a/b | | | | |
|---|---|---|---|---|---|---|---|---|
| Point | 0 | 0.1 | 0.2 | 0.3 | 0.4 | 0.5 | 0.6 | 0.7 |
| 1 | −5.0 | −5.05 | −5.30 | −5.80 | −7.00 | −9.00 | −12.9 | −21.4 |
| 2 | +3.0 | +3.30 | +3.80 | +4.90 | +7.00 | +10.1 | +16.0 | +31.0 |
| 3 | 0 | +0.06 | +0.20 | +1.0 | +1.60 | +3.0 | +5.8 | +18.1 |
| 4 | +0.5 | +0.40 | 0 | −0.50 | −1.60 | −3.8 | −8.4 | −19.0 |

Application of this analysis to proppant 600 shown in FIG. 5 requires one other design choice prior to determining dimensions of the proppant. That choice is selection of the material to use. Glass has a number of desirable characteristics. It is strong in compression (to about 200,000 psi). In tension, virgin glass has been shown tensile strengths up to 1M psi. Often glass is exposed to and damaged by the environment which decreases its tensile strength. A review of FIG. 5 and the table above shows that point 2 is always in tension. Point 3 is also consistently in tension but to a much lesser degree. This would imply that point 2, a point on the interior of the sealed cylinder, will be composed of glass that has properties close to virgin glass, and thus a higher tensile strength than the material located at point 3.

This same analysis can be done with common versions of glass such as, A, C, E, and S glass or specific formulations. A specific formulation known as borosilicate glass will be used as an exemplar for further discussion. The use of glass as the material comprising the proppant is not meant to be exclusive of other viable materials such as ceramics, metals, oxides of metals, and similar materials which can be formed into these shapes.

Figure 6:
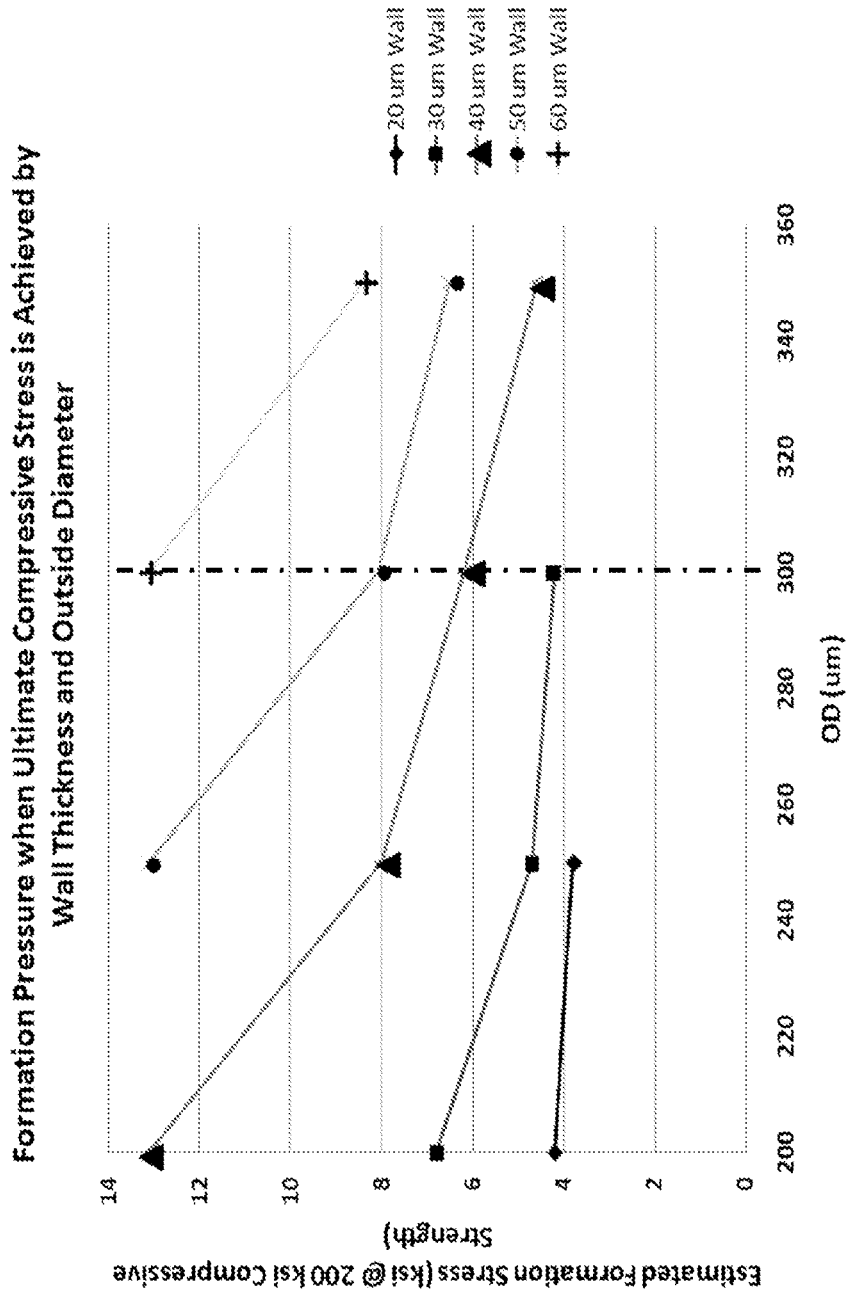
FIG. 6 is a graph showing estimated formation pressure required to produce stresses equal to assumed compressive strength for ranges of wall thickness and outside diameter.

FIG. 6 shows the estimated formation pressure at failure for various wall thicknesses using the cross section calculations above for borosilicate glass. Note that generally the higher formation pressures demand, as would be expected, thicker walls for a given OD of the particle. An illustrative line is drawn on the graph for a particle of 300 μm OD. If the particle had a 30 μm wall, it would likely fail at a bit more than a 4,000 psi formation pressure. To reach higher pressures, the wall thickness would have to be increased. FIG. 6 shows that a 50 μm wall thickness should withstand approximately 8,000 psi formation pressure which would jump to 13,000 psi with only an additional 10 μm of thickness added to the wall. It is equally possible to reverse the process and assume a formation pressure to determine acceptable values for the wall versus the transverse dimensions.

Figure 7:
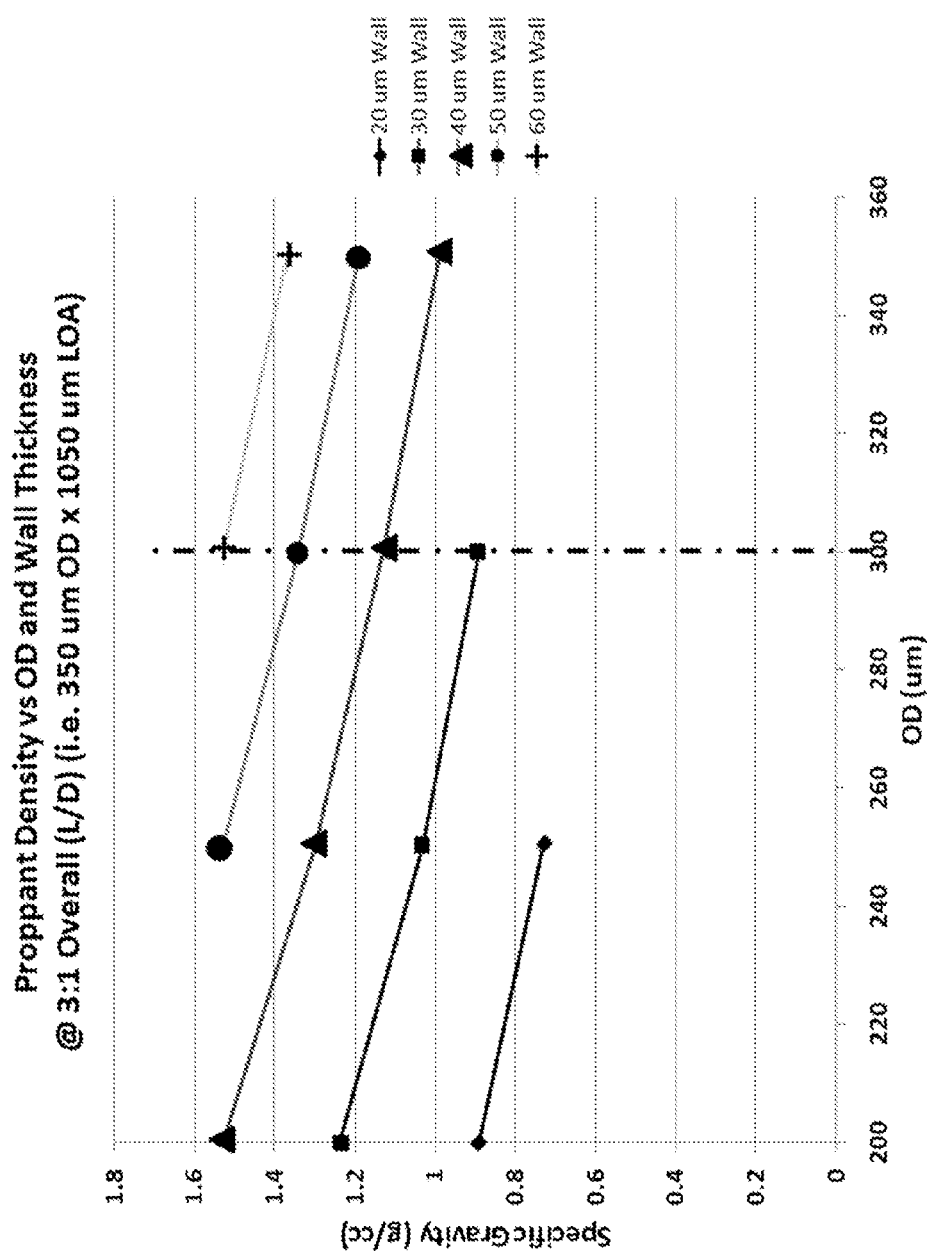
FIG. 7 is a graph showing proppant density for a range of wall thicknesses and outside diameters.

FIG. 7 shows the proppant density presented as specific gravity assuming borosilicate for different ODs and wall thicknesses. Furthermore, the graph assumes a 3:1 ratio of particle length to transverse dimension. For 300 μm transverse dimension particles, a wall thickness of 30 μm will result in a SG of approximately 0.9. However, FIG. 6 shows that this will result in an ability to withstand only approximately 4,000 psi of formation pressure. Conversely, withstanding 8,000 psi would require the 50 μm wall thickness from FIG. 6 but by FIG. 7 would result in a SG of approximately 1.3. A set of additional calculations could be made for different ratios of length to transverse dimension. Greater ratios (4:1, 5:1, etc.) would bring the curves down making it more possible to withstand a specific formation pressure for a given length.

The expected fracturing environment will influence the selection of particle size. One simple approach would be to examine what is commonly selected as proppant by size and use this as the particle OD. Knowing the expected formation pressure and the density of the fracturing fluid, it is possible to optimize the design of the proppant particle. An example will follow.

Figure 8:
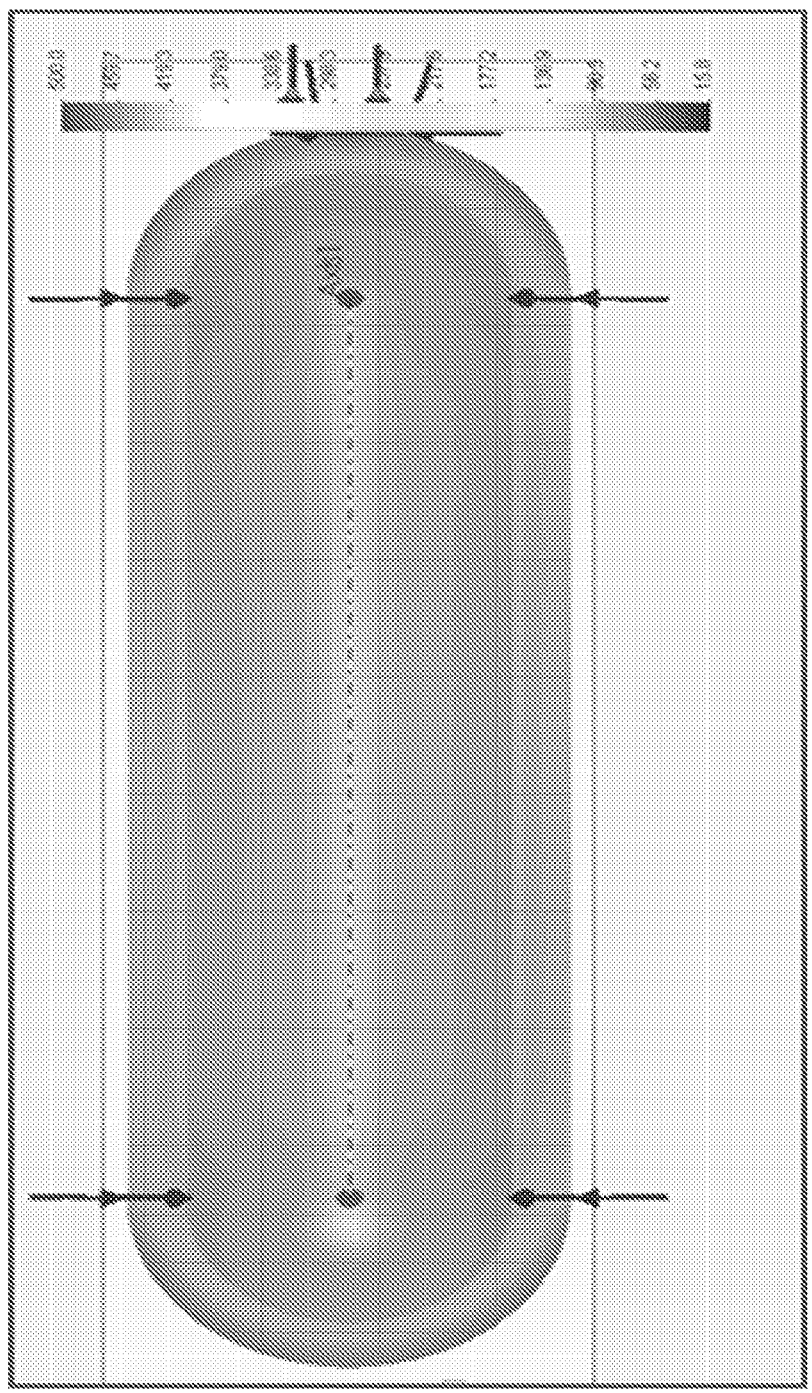
FIG. 8 shows the results of a finite element analysis of a cylindrical elongated particle under hydrostatic loading.

Another factor important to the feasibility of this proppant to be acceptable is not just its ability to withstand the formation closure pressures, but also the hydrostatic pressures experienced during pumping. A finite element model of the hollow spherical ended elongated proppant is presented in FIG. 8. This study indicated that the structure could withstand hydrostatic pressures in excess of 12,000 psi for a proppant particle of 1500 μm OD×5.5 mm Length×100 μm wall thickness. This has been confirmed experimentally. Generally, it is possible to assume that if the particle will survive the closure pressures, it will survive the appropriate hydrostatic pressures necessary to emplace it.

The particle may be closed ended elongatedly shaped. The shape may vary slightly due to the manufacturing process without changing the purpose or general character of the particle. The particle size may have a transverse dimension as measured from side to side for the closed ended elongated shape (referred to as elongated particle) from about 100 μm to 2500 μm outside transverse dimension (OD). For the elongated particle, the length of the particle is measured from the end of the particle's substantially constant sized ended segment to the opposing substantially constant sized ended segment. This length may be from about 1 time the OD, a sphere, to about 6 times the OD, an oblong pill shaped particle. This provides a length of about 100 μm to 15,000 μm.

In this implementation, the particle, particularly the elongated particle, has a closed end. This end may be substantially hemispherical in character as shown in FIG. 4, but may also vary significantly in shape by design or simply by manufacture. Thus an elongated cylindrical particle may have a nominally flat closed end; a closed end portions of which have a radius less than the radius of the cylinder itself; and/or portions of which have a radius greater than the radius of the cylinder itself. A closed end may also be formed when the end of the particle is closed by pinching, cutting, pulling, or shrinking; or any combination of these forms. It is to be further understood that when the cross section of the elongated particle is not perfectly circular the above description of the closed end in the case of a substantially cylindrical particle does not limit the scope of the invention to closures which are rotationally symmetric.

Similarly, the implementations described in FIGS. 1-8 have been depicted with substantially constant wall thicknesses. It is to be further understood that the process of closing the ends of the elongated or cylindrical particles may result in deviations from a constant wall thickness and thus the depictions in FIGS. 1-8 do not limit the scope of the invention to closures which have a constant wall thickness.

The particle contains a hollow void in the center segregated from the exterior by a contiguous wall. This wall thickness may be from about 35% of the OD of the particle to about 5% of the particle OD. This wall should be nominally uniform but may include some non-uniformity, particularly on the ends of the cylindrical particle.

The particle can withstand uniaxial contact pressure applied along the long surface of the cylindrical particle. In a uniform mono-layer of particles, these particles can be designed to withstand uniaxial contact pressures that range from about 0 pounds per square inch to about 4,000 pounds per square inch to about 8,000 pounds per square inch to about 12,000 pounds per square inch to about 18,000 pounds per square inch.

The particle can withstand hydrostatic pressure applied uniformly to the exterior surface the spherical or cylindrical particle. Individual particles can be designed to withstand uniform hydrostatic pressures that range from about 0 pounds per square inch to about 4,000 pounds per square inch to about 8,000 pounds per square inch to about 12,000 pounds per square inch to about 18,000 pounds per square inch to about 22,000 pounds per square inch.

The particle may be composed of glass, such as A, C, E, and S glass, unique formulations of glass for particular strength and fracture behavior such as but not limited to borosilicate glass nominally composed of, for example, 80.6% $SiO_2$, 13.0% $B_2O_3$, 4.0% $Na_2O$, 2.3% $Al_2O_3$; fused quartz, quartz, sapphire, or aluminosilicate; metals including aluminum, magnesium, iron, or copper, titanium, zirconium, or any combination or alloy of these metals; ceramics including but not limited to aluminum oxide, respective metal oxides, zirconium oxide, magnesium oxide, or any combination of these; silicon oxide, silicon nitride, silicon carbide, or combination of these materials.

The particle may be designed to have a nominal density from about 0.8 grams/$cm^3$ to about 1.0 grams/$cm^3$ to about 1.4 grams/$cm^3$ to about 1.75 grams/$cm^3$.

The particle has a surface that has minimal variations to its topology making it smooth or have a particle surface that was designed to have a specific topology that effects fluid flow, transport capabilities, porosity, load distribution, fracture behavior, or interaction with other particles.

The particle may have coatings which provide enhancement to structural integrity, fluid flow, transport capabilities, porosity, load distribution, fracture behavior, wettability, particle or fragment control, or interaction with other particles.

The present invention also relates to a method for producing a hollow spherical or hollow closed ended cylindrical (hereafter referred to as cylindrical particle) particles as presented above. The particles may be made by method of forming a precursor which is then completed as a final shape which can then undergo post-processing as desired.

Figure 9:
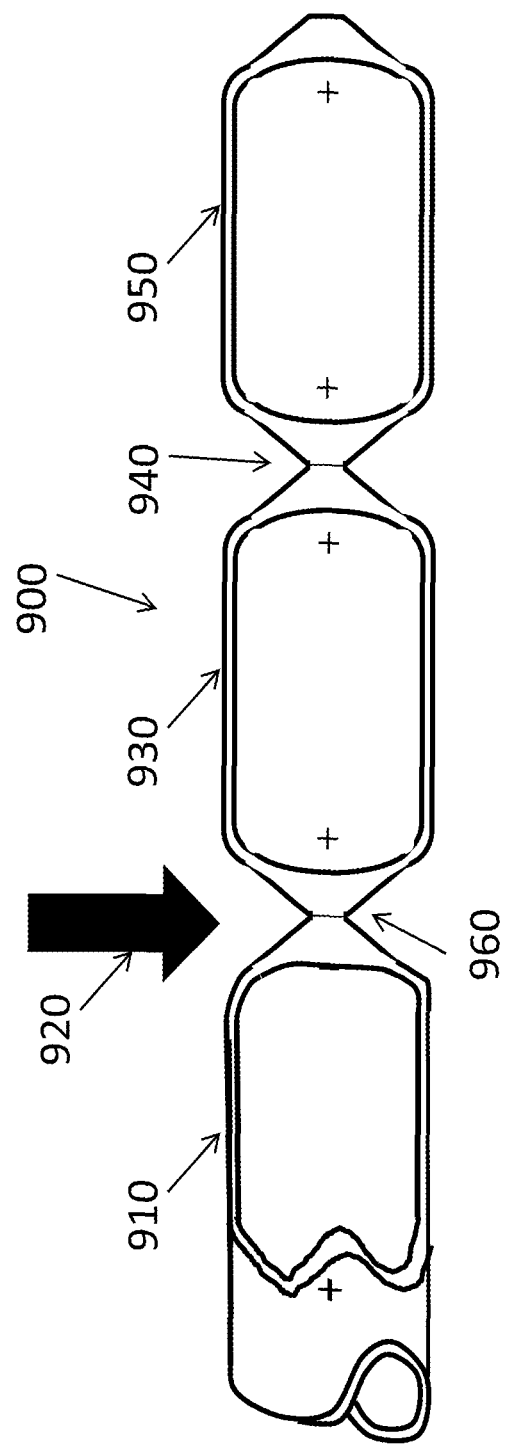
FIG. 9 is a cross-section of a process for forming particles as in FIGS. 1-2.

In one implementation, a proppant particle is produced by extruding a precursor hollow fiber tube from a melt to form a precursor hollow fiber. This fiber may be directly extruded and drawn to the appropriate wall thickness and OD as designed to meet specific needs as described above. The precursor fiber may be formed into hollow closed ended elongated particle as described above by cutting, crimping, breaking, melting, shrinking, thermally fusing, with or without the aid of external over-pressure and/or internal vacuum, with or without the aid of rolling, pulling, or twisting the particle during sealing and separation or by a combination of any of these methods. The particle formed of an appropriate length of the extruded precursor hollow fiber having the appropriate wall thickness may be first segregated from the fiber by first cutting, crimping, breaking, or a combination of these methods then the ends may be sealed through capillary action, surface tension, vacuum, or overpressure or a combination of these, facilitated by thermal heating of the particle or its ends as necessary such that the ends soften to allow these actions to close the ends. The particle of an appropriate length of the extruded precursor hollow fiber having the appropriate wall thickness may be first sealed through capillary action, surface tension, vacuum, or overpressure or a combination of these facilitated by thermal heating of the particle at the appropriate location to form the correct length particle such that the ends soften to allow these actions to close the ends. Subsequently, these particles may be cut, crimped, broken, or a combination of these methods may be used to separate the particles from the precursor and each other. The particles of an appropriate length of the extruded precursor hollow fiber having the appropriate wall thickness may concurrently be sealed through capillary action, surface tension, vacuum, or overpressure or a combination thereof facilitated by thermal heating of the particle at the appropriate location to form the correct length particle such that the ends soften to allow these actions to close the ends and to allow heating to continue till the particle is separated from the precursor due to thermal evaporation of the precursor material bridging two particles, capillary action such that the particles separate due to surface tension, or the particles may separate through mechanical separation from gravity, alternatively applied forces, torque, or pulling. FIG. 9 provides a general representation 900 of a process for forming the particles from a precursor hollow fiber 910. In FIG. 9 the precursor hollow fiber 910 is shown divided into elongated hollow particles 930, 950 of the desired length by one or more of the processes described above at locations 920, 940.

The method described above for extruded hollow fibers is extended to hollow fiber precursor of appropriate OD and wall thickness when pulled from a formed boule, hollow tube, cylinder, or hollow bulk precursor. In this method, the boule, hollow tube, cylinder, or hollow bulk precursor is heated in a zone sufficient to cause a change of viscosity to allow the form to be pulled into a smaller hollow fiber of the desired dimensions. This hollow fiber can be directly processed as above or spooled or retained for later processing as above.

The method as described above for creation of a hollow fiber precursor from the melt, through extrusion, or from a fiber created by pulling a fiber from a pre-form and subsequently processed into a hollow closed ended elongated particle may be composed of glass such as but not limited to A, C, E, or S glass or uniquely formulated glass such as borosilicate glass formed of, for example, $SiO_2$, 80.6%; $B_2O_3$, 13.0%; $Na_2O$, 4.0%; $Al_2O_3$, 2.3%, glasses of calcinates, silicon oxides, sapphire, quartz, fused quartz, basalt based materials, or a combination of these.

The method as described above for creation of a hollow fiber precursor from the melt, through extrusion, or from a fiber created by pulling a fiber from a pre-form and subsequently processed into a hollow closed ended elongated particle may be composed of metals such as but not limited to magnesium, aluminum, silicon, titanium, chrome, iron, nickel, copper, zinc, germanium, or their alloys compounds, or combinations.

In one implementation, a proppant particle is produced by extruding through a die from a bulk of green sinterable material to form a precursor hollow fiber. This fiber may be directly extruded to the appropriate wall thickness and OD as designed to meet specific needs as described above. The precursor fiber may be formed into a hollow closed ended elongated particle as described above by cutting, crimping, breaking, melting, shrinking, thermally fusing, with or without the aid of external over-pressure or internal vacuum, with or without the aid of rolling, pulling, or twisting the particle during sealing and separation or by a combination of any of these methods. The particle of an appropriate length of the extruded precursor hollow fiber having the appropriate wall thickness may be first segregated from the fiber first cutting, crimping, breaking, or a combination of these methods then the ends sealed through capillary action, surface tension, vacuum, or overpressure or a combination facilitated by thermal heating of the particle or its ends such that the ends soften to allow these actions to close the ends. The particle of an appropriate length of the extruded precursor hollow fiber having the appropriate wall thickness may be first sealed through capillary action, surface tension, vacuum, or overpressure or a combination facilitated by thermal heating of the particle at the appropriate location to form the correct length particle such that the ends soften to allow these actions to close the ends. Subsequently, these particles may be cut, crimped, broken, or a combination of these methods to separate the particles from the precursor and each other. The particles of an appropriate length of the extruded precursor hollow fiber having the appropriate wall thickness may concurrently be sealed through capillary action, surface tension, vacuum, or overpressure or a combination facilitated by thermal heating of the particle at the appropriate location to form the correct length particle such that the ends soften to allow these actions to close the ends and to allow heating to continue until the particle is separated from the precursor due to thermal evaporation of the precursor material bridging two particles, capillary action such that the particles separate due to surface tension, or the particles separate through mechanical separation from gravity, alternatively applied forces, torque, or pulling. Once formed, the particles are sintered to form a ceramic or fused composite particle with fully contiguous walls.

The method as described above for creation of a hollow sphere or hollow closed ended elongated particle from a green sinterable material, through extrusion, and subsequently processed into a hollow sphere or hollow closed ended elongated particle may be composed of ceramics, such as but not limited to, clay, quartz, feldspar, kaolin oxides of alumina, beryllia, ceria, zirconia, carbides, nitrides, borides, silicides, or their combination. Or, the method as described above where the sinterable material is a combination of glasses, metals, or oxides of metals such as but not limited to boron nitride, silicon carbide, aluminum nitride, or their combinations. Or, the method as described above where the sinterable materials are particles of sufficiently small size, about 0.1% to 10% of the thickness of the wall, which are metals such as but not limited to magnesium, aluminum, silicon, titanium, chrome, iron, nickel, copper, zinc, germanium, or their alloys compounds, or combinations, or the oxides of metals such as but not limited to magnesium, aluminum, silicon, titanium, chrome, iron, nickel, copper, zinc, germanium, or their alloys compounds, or combinations.

Figure 10:
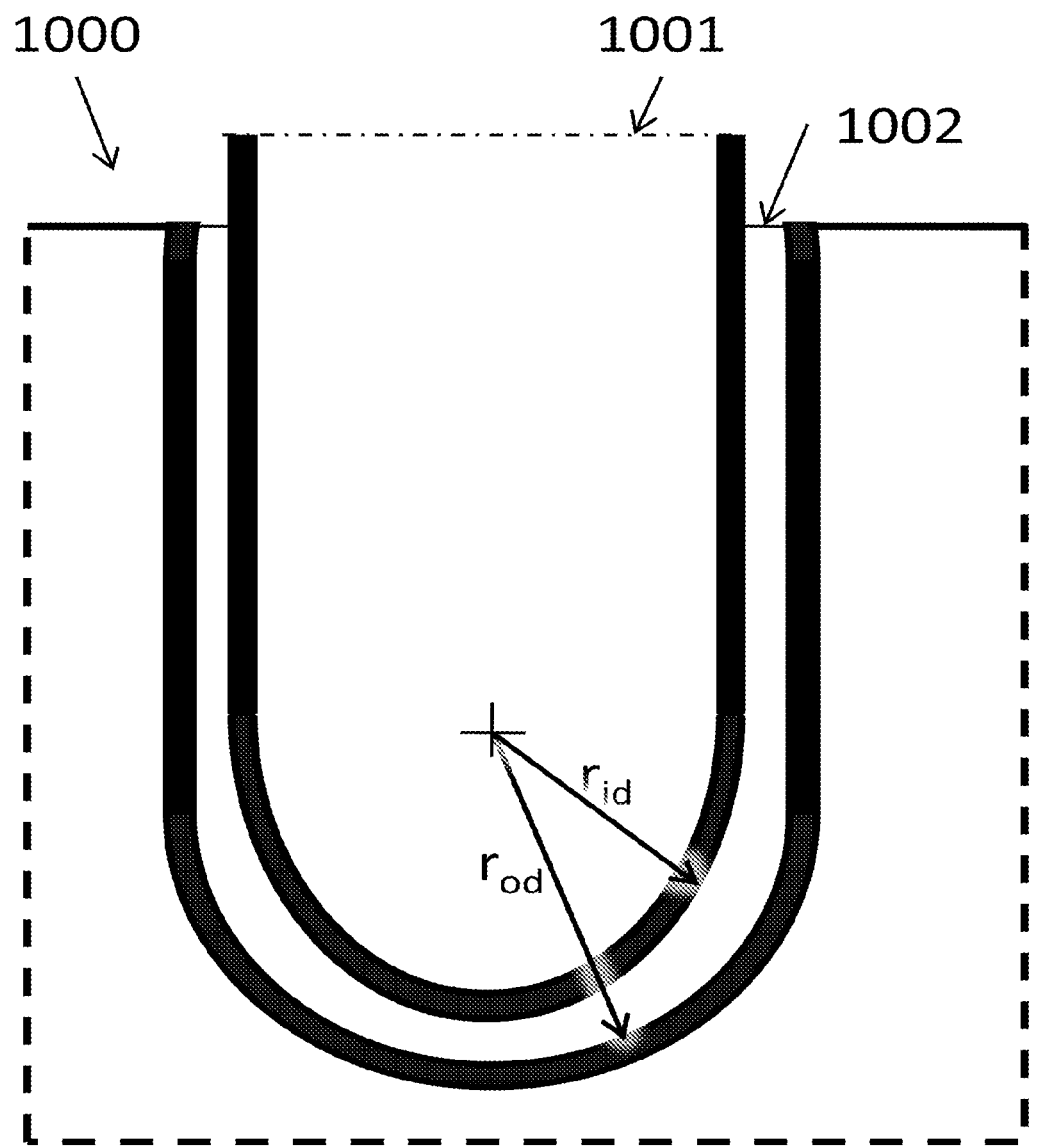
FIG. 10 shows a process for forming particles as in FIGS. 1-2.

In one implementation, depicted in FIG. 10, a proppant particle is produced by forming from a bulk precursor between a female mold 1000 and a male core 1001 a hollow structure 1002 closed at one end, which forms the precursor for a hollow sphere or hollow closed ended elongated particle. A quantity of bulk precursor is injected in a malleable form such as but not limited to borosilicate glass at about 960° C. into a mold which will form the shape of the exterior of the particle but allow one end to remain open. Into that end, a male core 1001 is inserted to establish the appropriate void space in the center of the particle while ensuring the correct wall thickness. The male core 1001 creating the void is then withdrawn and the particle end remaining open will be subsequently sealed by cutting, crimping, breaking, melting, shrinking, thermally fusing, with or without the aid of external over-pressure or internal vacuum, with or without the aid of rolling, pulling, or twisting the particle during sealing or by a combination of any of these methods.

Figure 11:
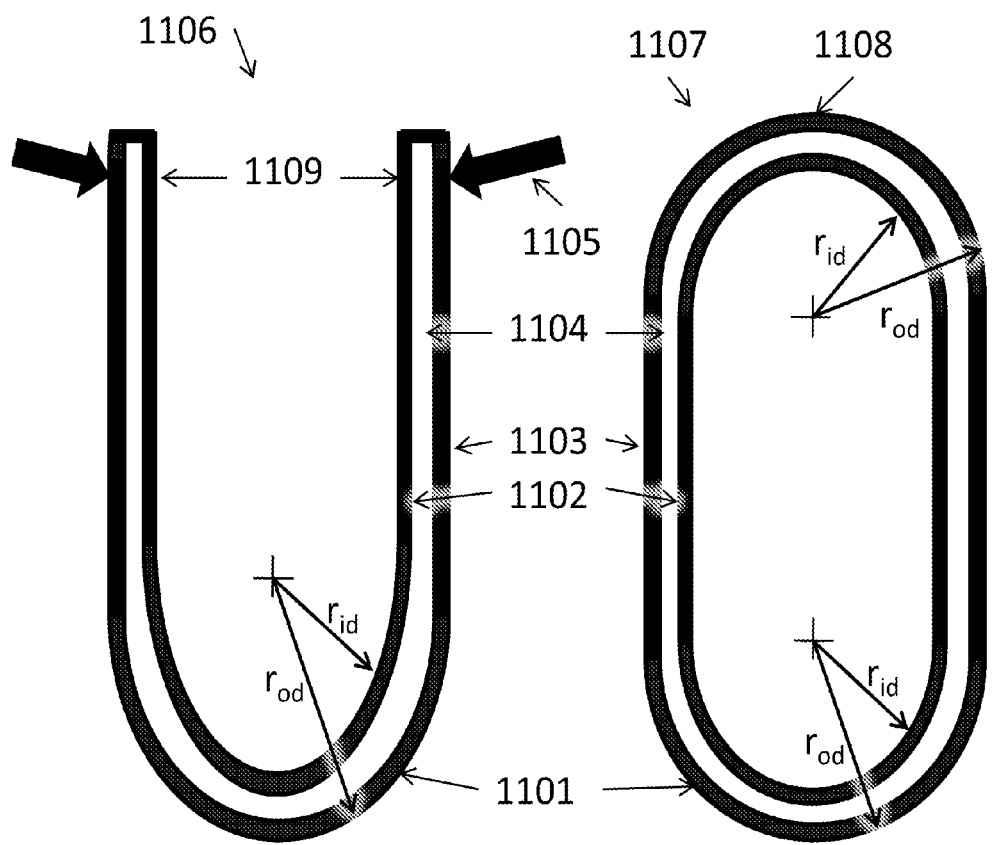
FIG. 11 shows a process for forming particles as in FIGS. 1-2.

FIG. 11 illustrates an elongated particle 1106 with one closed end 1101 and open end 1109 which open end 1109 is subsequently closed as described above by closing techniques 1105 described herein which causes the closure of the open end 1109 into the closed ended elongated particle 1107 with closure 1108. Open ended particle 1106 and closed ended particle 1107 each include inner wall 1102 and outer wall 1103 forming wall structure 1104. These particles may be sealed in the mold or ejected from the mold and then sealed.

The method as described above and illustrated in FIG. 11 for creation of a particle from the melt, through forming in a mold and subsequently processed into a hollow sphere or hollow closed ended elongated particle may be composed of glass such as but not limited to A, C, E, or S glass or uniquely formulated glass such as borosilicate glass formed of, for example, $SiO_2$, 80.6%; $B_2O_3$, 13.0%; $Na_2O$, 4.0%; $Al_2O_3$, 2.3%, glasses of calcinates, silicones, silicon oxides, sapphire, quartz, fused quartz or a combination of these.

The method as described above and illustrated in FIG. 11 for creation of a particle from the melt, through forming in a mold and subsequently processed into a hollow sphere or hollow closed ended elongated particle may be composed of metals such as but not limited to magnesium, aluminum, silicon, titanium, chrome, iron, nickel, copper, zinc, germanium, or their alloys compounds, or combinations.

In one implementation, a proppant particle is produced by forming from a bulk green precursor in a mold as illustrated in FIG. 11 a hollow structure which forms the precursor for a hollow sphere or hollow closed ended elongated particle.

As depicted in FIG. 10, a proppant particle is produced by forming from a bulk precursor between a female mold 1000 and a male core 1001 a hollow structure 1002 closed at one end, which forms the precursor for a hollow sphere or hollow closed ended elongated particle. A quantity of bulk precursor is injected in a malleable form such as but not limited to ceramic or metal oxides into a mold 1000 which will form the shape of the exterior of the particle but allow one end to remain open. Into that end a male core 1001 will be inserted to establish the appropriate void space in the center of the particle while ensuring the correct wall thickness. The male core 1001 creating the void will then be withdrawn.

FIG. 11 shows the particle end remaining open 1106 will be sealed by method such as cutting, crimping, breaking, melting, shrinking, forming, thermally fusing, with or without the aid of external over-pressure or internal vacuum, with or without the aid of rolling, pulling, or twisting the particle during sealing or by a combination of any of these methods, producing the sealed particle 1107. These particles may be ejected from the mold and then sealed or sealed in the mold. Once formed, the particles are sintered to form a ceramic or fused composite particle with fully contiguous walls.

The method as described above, as illustrated in FIG. 11, for creation of a hollow sphere or hollow closed ended elongated particle from a green sinterable material, through molding and subsequently processed into a hollow sphere or hollow closed ended elongated particle may be composed of ceramics, such as but not limited to, clay, quartz, feldspar, kaolin oxides of alumina, beryllia, ceria, zirconia, carbides, nitrides, borides, silicides, basalt based materials or their combination. Or, the method as described above where the sinterable material is a combination of glasses, metals, or oxides of metals such as but not limited to boron nitride, silicon carbide, aluminum nitride, or their combinations. Or, the method as described above where the sinterable materials are particles of sufficiently small size, about 0.1% to 10% of the thickness of the wall, which are metals such as but not limited to magnesium, aluminum, silicon, titanium, chrome, iron, nickel, copper, zinc, germanium, or their alloys compounds, or combinations, or the oxides of metals such as but not limited to magnesium, aluminum, silicon, titanium, chrome, iron, nickel, copper, zinc, germanium, or their alloys compounds, or combinations.

In one implementation, a proppant particle is produced by extruding a precursor hollow fiber tube from the melt. Dynamically manipulating local temperature, surface tension and viscosity of a portion of melt-spun or extruded hollow glass, ceramic or basalt-based materials body to initiate or facilitate breakup of that hollow glass, ceramic or basalt-based materials body to bring about breakup into closed hollow segments of length, transverse dimension, and wall thickness suitable for use as a neutrally buoyant proppant, including by modulated radiant heat input such as a chopped laser beam, modulated reflectance, transmittance and or absorbance of another body or bodies.

In one implementation, a proppant particle is produced by extruding a precursor hollow fiber tube from the melt. Dynamically manipulating local temperature, internal or external pressure, surface tension and viscosity of a portion of melt-spun or extruded hollow glass, ceramic or basalt-based materials body to initiate or facilitate breakup of that hollow glass, ceramic or basalt-based materials body to bring about breakup into closed hollow segments of length, transverse dimension, and wall thickness suitable for use as a neutrally buoyant proppant, including by means such as modulated radiant heat input such as the local external pressure and or heat transfer around a melt-spun or extruded hollow glass, ceramic or basalt-based materials body may be utilized to initiate or facilitate breakup of that body into segments of desired length, to include the use of combustion and combustion products to produce modulation of internal or external pressure, heat input and heat transfer.

In one implementation, the product according to the present invention might be produced by introducing molten glass, ceramic or basalt-based materials of a desired composition and properties into spinning container (melt spinner) with one or a plurality of suitably designed orifices for producing hollow fibers and thus producing hollow fibers at the exits of those orifices. That spinning container may be surrounded with a plurality of electric arcs, plasma arcs or lasers (continuous wave, pulsed or modulated) whose beam direction lies substantially parallel to the axis of spin. Thus, by a suitable choice of process parameters including but not limited to: suitable control of process variables controlling speed of filament formation, number of orifices, speed of rotation, number of lasers or plasma arcs; suitable modulation of laser beams or arc parameters; it will be possible to chop the hollow fibers into closed hollow segments of desired length, transverse dimension, and wall thickness suitable for use as a neutrally buoyant proppant.

In another implementation, the hollow fiber may be formed as above from a spinning melt but the creation of the separate particles is brought about by the jet breakup via surface tension modulation into closed hollow segments of length, transverse dimension, and wall thickness suitable for use as a neutrally buoyant proppant claimed by the present inventions.

A method for separating a previously prepared hollow fiber as described above by rolling the heated precursor body between two platens, each composed of one or multiple bodies, and at least one of which possesses ridges or lands separated by grooves which serve close the hollow precursor body into multiple hollow neutrally buoyant proppant (NBP) particles.

A method for forming individual hollow proppant particles by a discontinuous parison extrusion process combined with subsequent parison closure to form a hollow proppant particle of desired shape and size.

The methods described above provide hollow spherical or hollow closed ended cylindrical particles. The initial and primary purpose of the invention is to create particles with specific engineered characteristics.

A specific use for such engineered particles is as proppant for use in propping open a formation subsequent to or in conjunction with hydraulic fracturing of formation rock. The structural strength of the particle may be independently controlled while independently defining the specific gravity through adjustment of dimensions as described above. In this way, it is possible to produce a neutrally buoyant or substantially neutrally buoyant proppant that can withstand hydrostatic pressures experienced during the fracturing process and capable of withstanding formation closure pressures once in place. These particles will remain substantially intact following formation closure retaining a percolation network through the proppant. Proper selection of material from which the proppant is manufactured with or without coating may facilitate minimization of the creation of small particles or "fines." In this way, the proppant may be used in gas, oil or combination wells.

A specific use for such engineered particles is as packing to minimize sand flow into oil or gas wells. While it is possible to control the specific gravity of the particles, application of other controllable properties may be the focus of other uses. The particle may be engineered so that it can be of dimensions and strength such that it can maximize percolation network void space while being strong enough to withstand the environment in which it is used. Packing involves filling a well zone with a particle with sufficient strength to prevent degradation of the well bore or formation from occurring, such as migration of sand into the well while retaining a percolation network. For example, a particle could be designed which would not be damaged by the formation pressure but which had void spaces that allowed flow through the packing. Void space could also be designed such that it would restrict the flow of sand into the packing while retaining the percolation network.

A specific use for such engineered particles is as an additional component to cement, grout or other adhesive media pumped into subterranean structures. In many instances it is desirable to control the hydrostatic pressure imposed on subterranean formations or structures or geological formations by the vertical column of liquid or slurry cement or grout. The inclusion of such engineered particles in the liquid or slurry cement or grout will allow control of the density of the vertical column of liquid or slurry cement or grout and thus provide control over the downhole pressure to reduce or eliminate damage to subterranean formations or structures.

A specific use for such engineered particles is as an additional component to drilling fluid. In many instances it is desirable to control the hydrostatic pressure imposed on subterranean structures or geological formations by the vertical column of drilling fluid. The inclusion of such engineered particles in the drilling fluid will allow control of the density of the vertical column of drilling fluid and thus provide control over the downhole pressure to reduce or eliminate damage to subterranean formations or structures.

A specific use for such engineered particles is as a vehicle for catalysts. The environment in which catalysis takes place may require particles of substantial strength yet a large surface area. These properties can be accomplished and independently defined through the methods described herein.

A specific use for such engineered particles as described above is as a lightening agent for inclusion in other materials such as plastics or cements. By defining the particle strength and density, a particle may be created that can withstand stresses applied to the material or contribute to its strength. For example, particles of lower density than cement could be included which also have sufficient strength to prevent cement fracture and which can have a chemically acceptable surface such that the chemical binding between the particle surface and the material in which it is included can occur.

A specific use of the particles produced as described above is as a proppant but where the distribution of particle density may be engineered not as purely homogeneous, that is, a single density. Instead, an engineered distribution of particle densities may be produced or blended together from separately produced single density particles. Generally, it is believed that fractures in geological formations are oriented in a vertical direction, as fractures tend to grow perpendicular to the maximum compressive stress, which is usually vertical due to the weight of overburden. The distribution of particle densities would allow some particles to have a specific gravity less than that of the fracturing fluid, some particles neutrally buoyant with fracturing fluid, and some particles having a higher specific gravity than the fracturing fluid. A particle having an engineered density near to that of the fracturing fluid, but engineered to be lower or higher than the density of the fracturing fluid by a desired amount, will move upwards or downwards at a terminal velocity which is determined by the balance of forces due to the density difference between the particle and fluid (multiplied by the volume of the particle) and forces due to viscous drag, which are determined by the particle geometry, particle diameter, and the dynamic viscosity of the fracturing.

Figure 12:
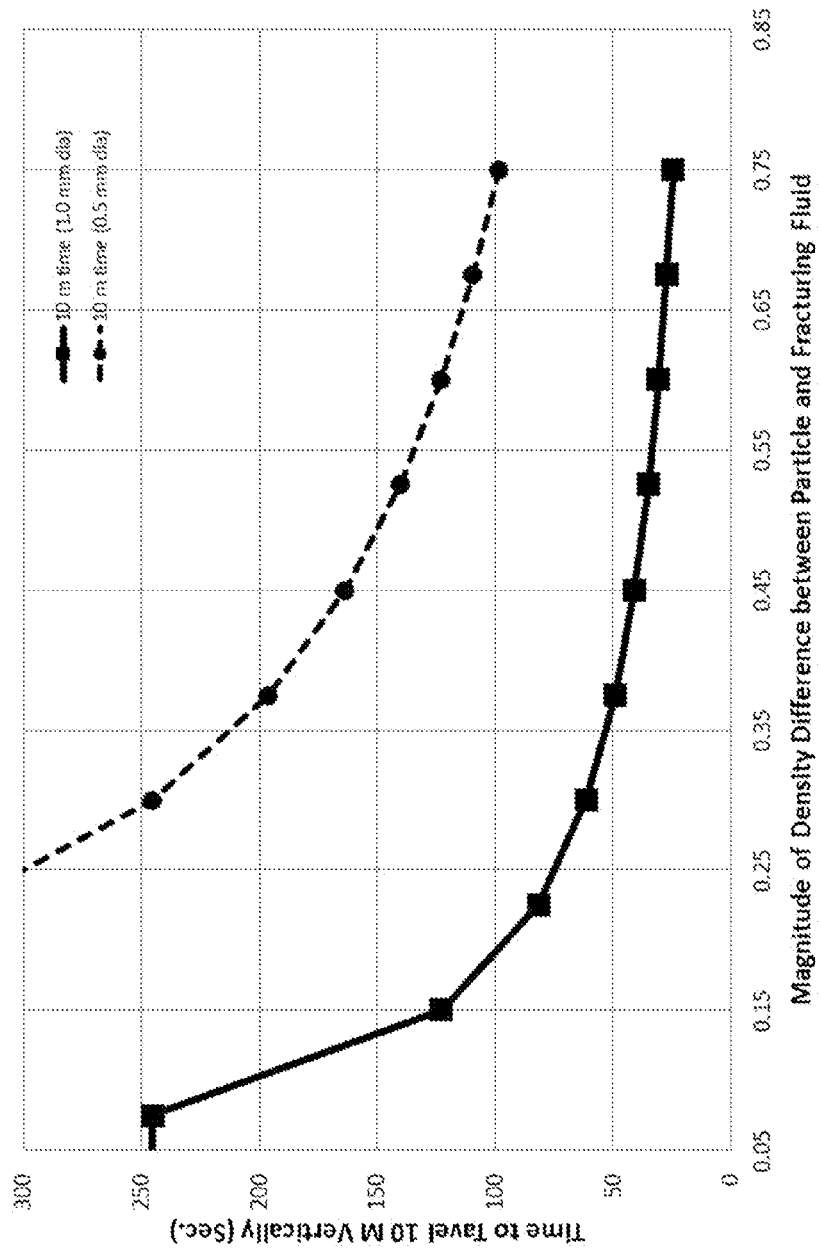
FIG. 12 is a graph showing vertical time travel for particles having different densities and sizes.

In the following description of the invention, the geometry of the particle is taken as spherical for simplicity of description, although the following illustration could be used for particles of other shapes as well. FIG. 12 illustrates the time required for a spherical particle of given density difference from the fracturing fluid (taken for the illustrative example of FIG. 12 to have the density and dynamic viscosity properties of water at 20° C.) to travel 10 meters in the vertical direction for the range of density differences shown in FIG. 12. It will be understood that the present Invention is not limited to spherical shapes, nor is it limited solely to the particle diameters or transverse dimensions shown in FIG. 12. In fact, in order to produce an engineered distribution of particle densities from a single precursor diameter and wall thickness, it is advantageous to utilize intentional differences in length of elongated particles to produce the desired engineered distribution of particle densities. Additionally, the present invention is not limited to the range of density differences shown in FIG. 12. An elongated hollow closed-ended particle as disclosed herein will have a somewhat different coefficient of viscous drag than a sphere of equal transverse dimension. Similarly, elongated particles of differing non-circular cross sections will have differing coefficients of viscous drag from each other. The viscous drag coefficient and therefore in particle terminal vertical velocity for an elongated particle will differ from that of a sphere as illustrated in FIG. 12.

It will be understood that this difference in viscous drag coefficient and therefore in particle terminal vertical velocity will not limit the scope of the invention. This would allow some desired fraction of the proppant to migrate to the top the fracture zone, another desired fraction to remain in the central region of the fracture zone, and another desired fraction of the proppant to migrate to the lower region of the fracture zone. In this situation, the distribution of proppant particle densities may be utilized or tailored such that a desired fraction of the total proppant placed in the fractures segregates to the upper and lower extremities of the fractures, respectively. In such a situation, the increased resistance to fracturing fluid flow during the hydraulic fracturing process caused by the intentional buildups of less dense and more dense proppant, respectively, at the tops and bottoms of the fracture, respectively, may be utilized to reduce the rate of growth of the fracture in those directions, with respect to the rate of growth in the horizontal direction. The advantage of this approach is that it allows the creation of hydraulic fractures which are longer in the horizontal direction than in the vertical directions, and which may be controlled to grow to greater or lesser extents upwards and or downwards from the points of perforation or fluid injection. This control of vertical fracture growth may be desirable when the zone or geological formation being fractured is limited in vertical extent, or is intruded from below (generally) by water (coning) or above (generally) by gas breakthrough.

It may also be desirable to limit the vertical extent of fracture growth to avoid other substantially horizontal structures such as other horizontal well bores. This situation may be described as controlled vertical screen-out, and is distinct from an existing process known as tip screen-out which is described, for example, in U.S. Pat. No. 7,237,612. The '612 patent discloses a screenout at the fracture tip due to a reduction in pumping flow rate, which allows proppant to build up near the fracture tip as fracturing fluid leaks off into the formation. In the method disclosed herein, the buildup of proppant at the top and bottom, respectively, of the fracture are due to the intentional engineered distribution of proppant densities. A specific use of the particles produced as described above is as a proppant where particles of different engineered densities are produced and inserted into the well during the fracturing process sequentially. Particles of lower density may be inserted in the initial fracturing fluid to facilitate the opening of the fracture; then, because of their lower density than the fracturing fluid, the particles would migrate to the upper region of the fracture. Subsequent proppant of greater density than the proppant fluid could be added to the fracturing fluid as it continues to be injected allowing the greater density proppant to flow into the full fracture and to migrate to the lower portion of the fracture. Subsequent proppant of substantially neutrally buoyancy could then be included in the fracturing fluid to allow the proppant to flow to the zone between the higher and lower density proppants. This sequence is not meant to be exclusive but exemplary and that any combination or sequence of different proppant buoyancies, sizes, or strengths may be used.

EXAMPLES

A substantially neutrally buoyant proppant for use in formations having 6,000 psi closure pressure and 10,000 psi hydrostatic pumping pressure can be developed according the above description. Using borosilicate glass, it is possible to see that a particle that is 300 μm OD and 900 μm length and with a 40 μm wall thickness will have a specific gravity of approximately 1.14. This proppant can be produced by being pulled from a pre-form hollow borosilicate glass rod softened in a furnace into a fiber which is then cut into particles and sealed concurrently using a high temperature plasma torch.

In a similar approach, proppant particles may be formed of hollow spheres through a sintering process. Spheres in contact with the formation offer essentially point contact for closure stresses. Sphere to sphere contact is the same. This leads to locally high stresses which, for a particular material, may exceed the yield strength of that material. The only mechanism available for countering this point stress is to thicken the wall of the sphere. Doing so reduces the internal void volume which reduces the achievable specific gravity. The material comprising the hollow sphere, maximum outside transverse dimension, and target closure pressure define the wall thickness and, therefore, the specific gravity of a spherical proppant.

The elongated design with closed ends and integral structural integrity provides a unique method of achieving a reduced specific gravity manufactured proppant. As for the sphere example above, the material is chosen to comprise the sphere along with the maximum outer transverse dimension of the grain and the target closure pressure. Because the structure is a closed ended elongated particle, the formation pressures do not exclusively form point stresses. Instead, stress may be distributed along the entire length of the cylinder outer wall. For a given material strength, the wall can be thinner while still not exceeding its yield strength. The interior void space can be increased simply due to thinner walls versus the sphere for similar materials. Unlike the sphere, the hollow cylinder or closed ended elongated particle provides another variable, length, which can allow creation of additional void space which, in turn, reduces the specific gravity.

By retaining the structural strength while reducing the specific gravity of the proppant, the proppant will flow deeper into the fracture. If neutral buoyancy is achieved, the proppant may be expected to flow to the extents of the fracturing fluids or until the size of the fracture is less than that of the transverse dimension of the proppant. If reduced specific gravity is achieved but not sufficient to produce neutral buoyancy, then the fracturing fluid may be thickened to reduce the proppant falling out of solution prior to being pumped into the full extent of the fracture. The amount of thickening agent necessary to transport the proppant deep into the well is reduced versus that for conventional proppants. As a result, the reduced thickening agents will have a less deleterious effect on the pores of the formation.

While the invention has been described in conjunction with specific exemplary implementations, it is evident to those skilled in the art that many alternatives, modifications, and variations will be apparent in light of the foregoing description. Accordingly, the invention is intended to embrace all such alternatives, modifications, and variations that fall within the scope and spirit of the appended claims.

What is claimed is:

1. A single component proppant particle for use in hydraulic fracturing, wherein a fracturing fluid is inserted into a rock formation to create a hydraulic fracture, the particle being formed from a single bulk material and having a substantially cylindrical shape with closed ends and a single wall structure defining a transverse dimension and a longitudinal dimension of the particle and a single internal void space within the particle, the void space also having a transverse dimension that is at least 0.2 times the maximum transverse dimension of the particle; the wall structure providing the particle with sufficient strength to withstand hydrostatic pressure of the fracturing fluid and closing pressures from the formation; the wall structure being formed of a material that is substantially impervious to the fracturing fluid.

2. The single component proppant particle of claim 1 comprising a center portion and two end portions, wherein one or more of the end portions are substantially hemispherical, substantially flat, or are substantially elongated in shape to form the substantially cylindrical shape of the particle.

3. The single component proppant particle of claim 1, wherein the single wall structure is formed of the single bulk material that comprises glass, metal, or ceramic materials or a combination thereof.

4. The single component proppant particle of claim 1, wherein the single wall structure is formed of the single bulk material that comprises A, C, E, or S glass, borosilicate glass, glasses of calcinates, or a combination thereof.

5. The single component proppant particle of claim 1, wherein the single wall structure is formed of the single bulk material that comprises aluminum, magnesium, iron, copper, titanium, zirconium, or a combination, compound, oxide, or alloy thereof.

6. The single component proppant particle of claim 1, wherein the single wall structure is formed of the single bulk material that comprises aluminum oxide, metal oxides, zirconium oxide, magnesium oxide, or a combination thereof.

7. The single component proppant particle of claim 1, wherein the single wall structure is formed of the single bulk material that comprises silicon oxides, sapphire, quartz, fused quartz, silicon nitride, silicon carbide, or a combination thereof.

8. The single component proppant particle of claim 1, wherein the particle has a transverse dimension of about 100 μm to 2500 μm outside transverse dimension (OD).

9. The single component proppant particle of claim 1, having a length that is about 3 to 6 times the transverse dimension of the particle.

10. The single component proppant particle of claim 1, wherein the single wall structure has a thickness that is about 35% to 5% of the OD of the particle.

11. The single component proppant particle of claim 1, wherein the single wall structure has a thickness of about 10 μm to 850 μm.

12. The single component proppant particle of claim 1, wherein the particle when formed can withstand hydrostatic pressure up to about 22,000 psi.

13. The single component proppant particle of claim 1, wherein the particle when formed can withstand closure pressures up to about 18,000 psi.

14. The single component proppant particle of claim 1, wherein the particle has a density of about 0.8 gm/cm$^3$ to 1.75 gm/cm$^3$.

15. A method of producing the single component proppant particle of claim 1 having a substantially cylindrical shape, the method comprising:
   forming a continuous hollow core tubular precursor having a substantially cylindrical shape;
   shaping the continuous hollow core tubular precursor to form the proppant particle having ends;
   closing and sealing the ends of the proppant particle; and
   separating the sealed proppant particle from the continuous hollow core tubular precursor to form the single component proppant particle having a substantially cylindrical shape.

16. The method of claim 15, wherein the act of forming the continuous hollow core tubular precursor comprises spin forming the continuous hollow core tubular precursor from a melt or extruding the continuous hollow core tubular precursor from a green precursor material and sintering the green precursor material to form a ceramic.

17. The method of claim 15, wherein at least one of the acts of closing and sealing the ends of the proppant particle or separating the sealed proppant particle from the hollow core tubular precursor comprises heating the region of the continuous hollow core tubular precursor by one or more of electric resistance conductance, flame, plasma arc, electric arc, laser, or a combination thereof.

18. The method of claim 15, wherein at least one of the acts of closing and sealing the ends of the proppant particle or separating the sealed proppant particle from the hollow core tubular precursor comprises spinning the continuous hollow core tubular precursor to apply centrifugal force to close and seal the ends of the single component proppant particle.

19. The method of claim 15, wherein the act of closing and sealing the ends of the proppant particle comprises applying periodic applications of combustion products to the continuous hollow core tubular precursor to produce controlled temporally periodic variations in local external pressure and heat to the continuous hollow core tubular precursor to fully seal the ends of the single component proppant particle.

20. The method of claim 15, wherein the act of separating the sealed proppant particle from the continuous hollow core tubular precursor comprises heating the continuous hollow core tubular precursor and then one or more of pulling, bending, or applying physical force to the heated continuous hollow core tubular precursor to form the single component proppant particles.

21. A method of producing the single component proppant particle of claim 1, the method comprising:
   injecting melted precursor or green ceramic precursor into a mold having a substantially cylindrical shape to form a single component proppant particle having a substantially cylindrical shape and an open end; and
   closing and sealing the open end of the single component proppant particle.

22. The method of claim 21, wherein the act of closing and sealing the open end of the particle comprises one or more of cutting, crimping, or physically sealing the particle.

23. The method of claim 21, wherein the act of closing and sealing the open end of the particle comprises one or more of applying capillary action, surface tension, or heating a region of the particle and applying localized overpressure to the region, or a combination thereof.

24. The method of claim 23, wherein the act of closing and sealing the open end of the particle comprises heating the region of the hollow core tubular precursor by one or more of electric resistance conductance, flame, plasma arc, electric arc, laser, or a combination thereof.

25. The method of claim 21, further comprising cooling the single component proppant particle after the open end is closed and sealed.

26. The method of claim 15, wherein the hollow core tubular precursor is formed from a boule and the act of shaping the hollow core tubular precursor comprises thermally heating the hollow core tubular precursor and pulling or drawing it through a die to the desired shape.

27. The method of claim 15, wherein the act of closing and sealing the ends of the proppant particle comprises one or more of cutting, crimping, breaking, shrinking, or thermally fusing the proppant particle.

28. The method of claim 15, wherein the act of closing and sealing the ends of the proppant particle further comprises one or more of external over-pressure, internal vacuum, or rolling, pulling, or twisting the proppant particle.

29. A method of using the particle of claim 1 as a proppant, the method comprises inserting the particle into a hydraulic fracture to keep the fracture from closing.

30. A plurality of the single component proppant particles of claim 1, wherein at least a first fraction of the particles have different predetermined densities from a second fraction of the particles based on the particular material of the wall structure, thickness of the single wall structure, and dimensions of the substantially cylindrically shaped particles.

31. A method of controlling the horizontal and vertical extent of a hydraulic fracture, the method comprising:
   choosing at least the first fraction and the second fraction of the plurality of particles of claim 30 based on the predetermined densities desired to control the horizontal and vertical extent of the fracture; and
   inserting the plurality of the substantially cylindrical proppant particles of claim 30 into the hydraulic fracture to prop open the fracture and to control the vertical and horizontal extent of the propped open fracture.

32. A plurality of the proppant particles of claim 30, each particle being formed of a single component and having a substantially cylindrical shape with closed ends and a void space within the particle, the plurality of particles having sufficient strength to withstand hydrostatic pressures of a fracturing fluid and closing pressures of a hydraulic fracture, while being substantially impervious to the fracturing fluid, and the plurality of particles including one or more fractions each having a predetermined density, such that the fraction may rise, sink, or float within the hydraulic fracture, as desired.

33. The plurality of proppant particles of claim 32, wherein the particles are formed of a single bulk material and include a single wall structure defining the void space within the particle and wherein the predetermined density of each fraction is based on the single bulk material and size of the void space within the particle.

34. A method of controlling the specific gravity of the single component proppant particle of claim 1, the method comprising:
   choosing the particular bulk material of the single wall structure, thickness of the single wall structure, and the dimensions of the substantially cylindrically shaped proppant particle to achieve the desired specific gravity of the single component substantially cylindrically shaped proppant particle.

35. A method of adjusting the strength of the single component proppant particle of claim 1 to withstand varying hydrostatic pressures of the fracturing fluid and closing pressures from the formation, the method comprising:
   choosing the particular bulk material of the single wall structure, thickness of the single wall structure, and longitudinal and transverse dimensions of the substantially cylindrical proppant particle to achieve the desired strength of the single component substantially cylindrical proppant particle to withstand varying hydrostatic pressures of the fracturing fluid and closing pressures from the formation.

36. A method of controlling the specific gravity and adjusting the strength of the single component proppant particle of claim 1 to withstand varying hydrostatic pressures of the fracturing fluid and closing pressures from the formation, the method comprising:

choosing the particular bulk material of the single wall structure, thickness of the single wall structure, and longitudinal and transverse dimensions of the substantially cylindrical proppant particle to achieve the desired strength of the single component substantially cylindrical proppant particle to withstand varying hydrostatic pressures of the fracturing fluid and closing pressures from the formation.

* * * * *